United States Patent
Kato et al.

[11] Patent Number: 5,875,003
[45] Date of Patent: Feb. 23, 1999

[54] APPARATUS AND METHOD FOR ENCODING A DIGITAL VIDEO SIGNAL

[75] Inventors: Motoki Kato; Takashi Kojima, both of Kanagawa, Japan

[73] Assignee: Sony Corporation, Tokyo, Japan

[21] Appl. No.: 962,886

[22] Filed: Nov. 10, 1997

Related U.S. Application Data

[63] Continuation of Ser. No. 694,312, Aug. 8, 1996, abandoned.

[30] Foreign Application Priority Data

Aug. 9, 1995 [JP] Japan ..... 7-203282
May 2, 1996 [JP] Japan ..... 8-111681

[51] Int. Cl.$^6$ ............... H04N 7/36; H04N 5/14; H04N 9/64
[52] U.S. Cl. .................... 348/699; 348/700; 348/416
[58] Field of Search ..................... 348/411, 416, 348/700, 701, 699, 384, 390, 400, 402, 403, 413, 415, 409, 420, 396; 382/236, 239; H04N 7/36, 5/14, 9/64

[56] References Cited

U.S. PATENT DOCUMENTS

| | | | |
|---|---|---|---|
| 5,260,782 | 11/1993 | Hui | 348/416 |
| 5,285,266 | 2/1994 | Jo | 348/700 |
| 5,361,105 | 11/1994 | Iu | 348/699 |
| 5,499,057 | 3/1996 | Kondo et al. | 348/607 |
| 5,635,281 | 6/1997 | Ko et al. | 348/700 |

*Primary Examiner*—Tommy P. Chin
*Assistant Examiner*—Nhon T. Diep
*Attorney, Agent, or Firm*—Frommer Lawrence & Haug, LLP; William S. Frommer

[57] ABSTRACT

Apparatus and corresponding method which motion compensate encode a digital video signal pre-filtered in a first filter but use motion information derived from the same video signal pre-filtered in a second filter to encode the first-filtered video signal. A received digital video signal is filtered in a first pre-filter which has a controllable filter characteristic that varies in response to several characteristics of the received digital video signal. The originally received digital video signal also is filtered in a second pre-filter. A motion vector is derived from motion that is detected in the second filtered signal, and the first filtered video signal is motion compensated encoded using the derived motion vector of the second filtered video signal.

36 Claims, 22 Drawing Sheets

APPARATUS AND METHOD FOR ENCODING A DIGITAL VIDEO SIGNAL

This application is a continuation of application Ser. No. 08/694,312, filed Aug. 8, 1996, now abandoned.

BACKGROUND OF THE INVENTION

The present invention relates to apparatus and method for encoding a digital video signal and, more particularly, to apparatus and method which motion compensates encodes a video signal pre-filtered by a first filter using motion information derived from the same video signal pre-filtered by a second filter.

As is known, digital video signals generally are compressed prior to being transmitted or recorded on a record medium. However, compression-encoding of a video signal causes a deterioration, for example, a block distortion or "ringing" of contour portions, of the video picture represented by the video signal. To reduce the loss of picture quality caused by such compression-encoding, it is common to supply the video signal through a low pass filter (called a pre-filter) prior to the compression thereof.

FIG. 1 is a block diagram of an encoder in which a digital video signal supplied to an input terminal 1 is applied to a pre-filter 2 before it is encoded in an encoding circuit 3. Pre-filter 2, which may be a low pass filter, removes various "noise" from the video signal and supplies the resultant filtered video signal (S11) to both hybrid encoding unit 31 and motion vector estimation (ME) unit 32. ME unit 32 detects motion in the video signal and supplies the detected motion as a motion vector S13 to hybrid encoding unit 31. Encoder 31, which generally is a motion compensating and transforming encoder, encodes the filtered video signal supplied from pre-filter 2 using motion vector S13 to produce an encoded video signal S12. The encoded video signal is supplied as an output at output terminal 4.

As is known, video signals are pre-filtered to prevent deterioration of the signal during the encoding thereof. Pre-filtering of the video signal also prevents noise that has been removed therefrom from otherwise erroneously being detected to represent motion in the video picture by ME unit 32.

One difficulty encountered in typical video signal encoders which include a pre-filter therein is their general inability to prevent a so-called "blurring" of video signals that have a high transmission bit rate, e.g., MPEG2 video signals, when the video signals are pre-filtered and subsequently encoded. Such blurring results in a loss of fine picture patterns which, in addition to lowering the picture quality, lowers the precision of motion detection by a motion detector, e.g., ME unit 32. On the other hand, if a video signal having a high transmission bit rate is not filtered before it is encoded, high frequency noise in the video signal erroneously is detected as motion therein.

If a video signal having a low transmission bit rate, e.g., an MPEG1 video signal, is filtered and encoded, the motion detection precision of ME unit 32 is lowered. On the other hand, if a video signal transmitted at a low bit rate is not pre-filtered, the amount of data in (i.e., the bit rate of) the resultant encoded video signal may exceed a desired bit rate or the bit rate at which the encoder is capable of transmitting.

Another difficulty encountered in the above-discussed video signal encoders is their general inability to encode video signals that are derived from a film source without substantially deteriorating those video signals. As is known, a picture signal derived from a film source has so-called grain noise (or granular noise) which adds "texture" to the film picture. Grain noise is desirable in video signals derived from a film source and is distinguished from other types of noise, for example, high frequency noise, which desirably should be removed from the video signal. When a motion video signal derived from a film source having either a high or a low transmission bit rate is filtered in a pre-filter prior to encoding, the pre-filter removes the high frequency noise, as well as the grain noise from the video signal. If a video signal having a low transmission bit rate is derived from a film source, pre-filtering thereof also undesirably lowers the motion detection precision of the motion detecting circuit, e.g., ME unit 32. However, if a video signal derived from a film source is not pre-filtered prior to being encoded, both high frequency noise and grain noise therein erroneously are detected to represent motion in the video signal. Further, the encoding of an unfiltered video signal transmitted at a low transmission bit rate may result in an encoded video signal with a transmission bit rate that exceeds that of the encoder or the accompanying circuits.

A further difficulty encountered in typical encoders is their general inability to encode motion video signals that represent multiple "scenes" that have been edited and combined therein without substantially deteriorating the video signals. Motion video that represents, for example, a television program, usually includes therein multiple scenes that have been produced by multiple cameras. The various scenes may represent, for example, a still picture, successive images having very high motion therein (e.g., an automobile chase), a fine textured image, a coarse textured image, etc. When a video signal that represents such different types of "scenes" is pre-filtered prior to being encoded, the quality of the resultant encoded picture is substantially lowered.

OBJECTS OF THE INVENTION

Therefore, it is an object of the present invention to provide apparatus and method for encoding a digital video signal which overcome the shortcomings of the above described devices.

Another object of the present invention is to provide apparatus and method for encoding a digital video signal which removes noise therefrom without substantially deteriorating the quality of the picture represented by the resultant encoded video signal.

A further object of the present invention is to provide apparatus and method which effectively remove noise from a video signal derived from a film source without deteriorating the picture quality of the resultant encoded video signal.

An additional object of the present invention is to provide apparatus and method which effectively remove noise from a video signal that represents plural different types of scenes without deteriorating the picture quality of the resultant encoded video signal.

Various other objects, advantages and features of the present invention will become readily apparent to those of ordinary skill in the art, and the novel features will be particularly pointed out in the appended claims.

SUMMARY OF THE INVENTION

In accordance with one embodiment of the present invention, apparatus and method operate to receive a digital video signal, filter the received digital video signal in accordance with video signal characteristic data that represents various characteristics (e.g., bit rate, luminance, motion and texture) of the received digital video signal to produce a first filtered video signal, filter the originally received digital video signal in accordance with the video signal characteristic data to produce a second filtered video signal, detect motion in the second filtered video signal so as to produce a motion vector, and encode the first filtered video signal in accordance with the motion vector to produce an encoded video signal.

As one aspect of the present invention, the bit rate of the received digital video signal is detected and the received digital video signal is filtered in accordance with the detected bit rate to produce the first filtered video signal.

As another aspect of the present invention, the received digital video signal is filtered in accordance with a detected amount of luminance of the video image represented by the video signal to produce the first filtered video signal which is encoded, and the originally received digital video signal also is filtered in accordance with the detected amount of luminance to produce the second filtered video signal in which motion is detected.

As a further aspect of the present invention, the amount of motion in the video signal is detected and used to control both filterings of the received digital video signal.

As yet another aspect of the present invention, scene changes are detected and the various characteristics of the received digital video signal are detected in response to each scene change.

As yet a further aspect of the present invention, each filter includes a time filter and a spatial filter for performing two different types of filtering of the received digital video signal.

In accordance with another embodiment of the present invention, apparatus and method operate to receive a digital video signal, detect a scene change of a video picture represented by the received digital video signal, detect in response to a scene change a plurality of characteristics of the received digital video signal to produce video signal characteristic data, filter the received digital video signal in accordance with video signal characteristic data to produce a first filtered video signal, filter the originally received digital video signal in accordance with the video signal characteristic data to produce a second filtered video signal, detect motion in the second filtered video signal so as to produce a motion vector, and encode the first filtered video signal in accordance with the motion vector to produce an encoded video signal.

In accordance with a further embodiment of the present invention, a record medium is formed by the process of receiving a digital video signal, filtering the received digital video signal in accordance with video signal characteristic data to produce a first filtered video signal, filtering the originally received digital video signal in accordance with the video signal characteristic data to produce a second filtered video signal, detecting motion in the second filtered video signal to produce a motion vector, encoding the first filtered video signal in accordance with the motion vector to produce an encoded video signal, and recording the encoded video signal on the record medium.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which.

DETAILED DESCRIPTION OF CERTAIN PREFERRED EMBODIMENTS

Figure 2:
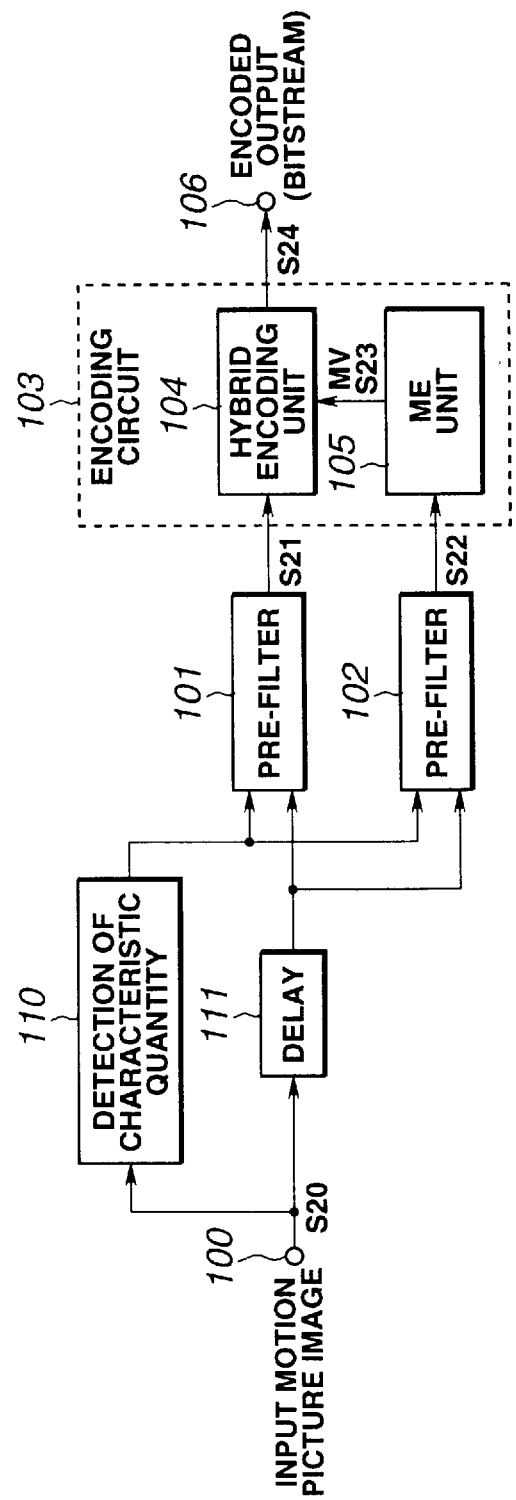
FIG. 2 is a block diagram of apparatus for encoding a digital video signal in accordance with the present invention.

Referring now to FIG. 2 of the drawings, apparatus for encoding a video signal in accordance with the present invention is shown. The encoding apparatus is comprised of a first pre-filter 101, a second pre-filter 102, an encoding circuit 103, a characteristic detection circuit 110 (also referred to as characteristic detector 110), and a delay circuit 111. A video signal representing a motion picture image supplied to an input terminal 100 is supplied to characteristic detector 110 which detects particular characteristics of the supplied video signal (to be discussed) and supplies to both pre-filters 101 and 102 a characteristic signal which includes therein data pertaining to the detected characteristics of the video signal. The original video signal also is supplied to delay 111 which delays the signal by an amount of time corresponding to the delay of characteristic detector 110, that is, delay 111 delays the video signal by the same amount of time required by characteristic detector 110 to detect the various characteristics of the video signal. Pre-filter 101 is a low pass filter whose filter characteristics are controlled by the characteristic signal supplied from detector 110 and which filters the video signal in a manner to be discussed and supplies the filtered video signal as a first filtered video signal S21 to hybrid encoding unit 104 included in encoding circuit 103. Pre-filter 102 also is a low pass filter whose filter characteristics are controlled by the characteristic signal supplied from detector 110 and which filters the same video signal supplied to pre-filter 101 in a manner to be discussed to produce a second filtered video signal S22 which is supplied to motion vector estimation (ME) unit 105 included in encoding circuit 103. ME unit 105 detects motion in the second filtered video signal S22 and supplies the detected motion as a motion vector S23 to hybrid encoder 104. Hybrid encoder 104 encodes the first filtered video signal S21 in a manner to be discussed utilizing motion vector S23 supplied thereto (also to be discussed) to produce an encoded video signal S24 which is output at an output terminal 106.

In accordance with the present invention, pre-filters 101 and 102 separately filter the same video signal to produce two different filtered video signals S21 and S22 which are respectively supplied to hybrid encoder 104 and ME unit 105. As will be understood, pre-filter 102 removes noise from the video signal which ME unit 105 may erroneously detect to represent motion in the video signal. Pre-filter 101, on the other hand, filters noise from selected video signals depending on the characteristics thereof. It will be seen that by using two different filters, such as shown in FIG. 2, picture deterioration is prevented or, at least, minimized while preventing the resultant encoded video signal from exceeding a desired transmission bit rate.

Figure 3:
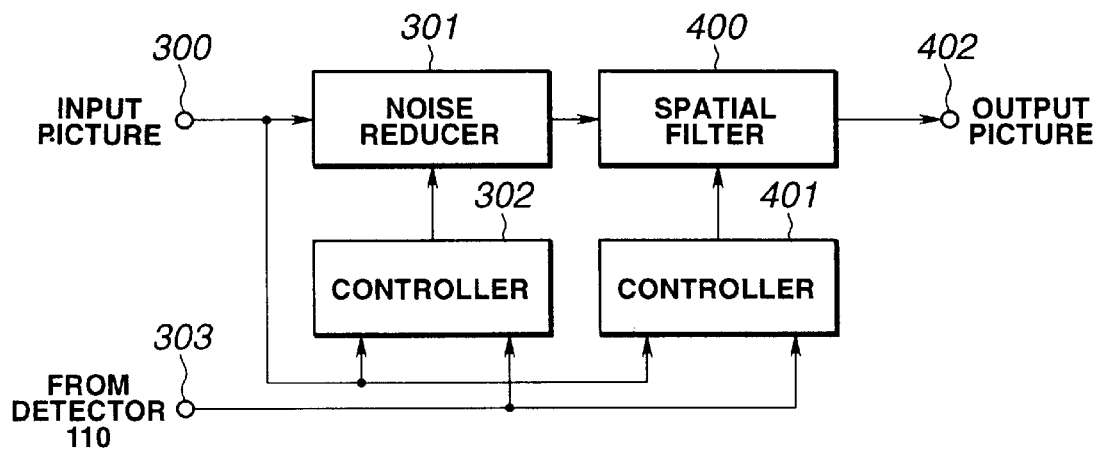
FIG. 3 is a block diagram of the pre-filters shown in FIG. 2.

FIG. 3 is a block diagram of both pre-filters 101 and 102 shown in FIG. 2 wherein each pre-filter is comprised of a noise reducer circuit 301 (also identified herein as time filter 301), a controller 302, a spatial filter circuit 400 and another controller 401. Noise reducer circuit 301 is a so-called time filter which utilizes the data of at least two successive frames so as to remove noise therefrom (to be further discussed) and spatial filter 400 is an "intraframe" filter which utilizes data from individual frames so as to remove noise therefrom. Controllers 302 and 401 respectively control noise reducer 301 and spatial filter 400 in response to the characteristic signal supplied from characteristic detector 110.

In accordance with the present invention, characteristic detector 110 shown in FIG. 2 detects various characteristics of the input video signal including the degree of texture of each video image represented by the video signal, i.e., the coarseness (or fineness) of the picture pattern, the transmission bit rate of the video signal, the amount of motion in the video signal (i.e, fast motion, medium motion, or slow motion), and the amount of luminance in the video signal (i.e., the "lightness" or "darkness" of the picture). It is seen that if picture motion is relatively fast, fine textures in the video images are not visually observed. Conversely, if picture motion is slow (or still), fine textures in the video image are readily visualized. Therefore, and in accordance with the present invention, a strong low pass filter characteristic generally is used for video signals having fast (or high) motion therein, and a weak low pass filter characteristic is used for video signals having slow or no motion therein.

Pre-filters 101 and 102 further are controlled by the amount of luminance (or luminosity) of the video signal. It is known that viewers are substantially more sensitive to light pictures (i.e, high luminance levels) and are less sensitive to relatively dark pictures. In addition, viewers are less sensitive to "after-images" in video images that are primarily entirely high in luminance level (e.g., day-time images) (i.e., the sensitivity along the time axis is reduced for high luminance pictures), and are more sensitive to after-images in video images that primarily have very low luminance levels. Therefore, and in accordance with the present invention, noise reducer 301 of a pre-filter strongly filters a video signal that, in its entirety, has a high luminance level.

The pre-filters of the present invention further are controlled by the transmission bit rate of the video signals supplied thereto, wherein video signals having a low transmission bit rate are "strongly" pre-filtered so as to decrease the bit rate of the resultant encoded video signal.

Table 1, shown below, and in accordance with the present invention, illustrates the type of filtering used by time filter 301 and spatial filter 400 of both pre-filters 101 and 102 for the various detected characteristics of a video signal having a low transmission bit rate that is supplied to the encoding apparatus of the present invention. As previously discussed, the first filtered video signal output from pre-filter 101 is supplied to hybrid encoder 104 which encodes (i.e., intraframe and interframe, and motion compensating encodes) the video signal therein, and the second filtered video signal output from pre-filter 102 is supplied to ME unit 105 which detects motion therein to produce a motion vector that is supplied to hybrid encoder 104.

Similarly, Table 2, shown below, shows the selected filter characteristics of time filter 301 and spatial filter 400 of both pre-filters 101 and 102 for various characteristics of a video signal having a high transmission bit rate.

TABLE 1

LOW BIT RATE TRANSMISSIONS

| | | | | PRE-FILTER 101 | | PRE-FILTER 102 | |
|---|---|---|---|---|---|---|---|
| ITEM | MOTION | TEXTURE | LUMINANCE | TIME FILTER 301 | SPATIAL FILTER 400 | TIME FILTER 301 | SPATIAL FILTER 400 |
| 1. | FAST | FINE | LIGHT | ON | STRONG | ON | OFF |
| 2. | FAST | COARSE | LIGHT | ON | STRONG | ON | OFF |
| 3. | FAST | FINE | DARK | OFF | STRONG | OFF | OFF |
| 4. | FAST | COARSE | DARK | OFF | STRONG | OFF | OFF |
| 5. | MEDIUM | FINE | LIGHT | ON | MEDIUM | ON | OFF |
| 6. | MEDIUM | COARSE | LIGHT | ON | MEDIUM | ON | OFF |
| 7. | MEDIUM | FINE | DARK | OFF | MEDIUM | OFF | OFF |
| 8. | MEDIUM | COARSE | DARK | OFF | MEDIUM | OFF | OFF |
| 9. | SLOW | FINE | LIGHT | ON | OFF | ON | OFF |
| 10. | SLOW | COARSE | LIGHT | ON | WEAK | ON | OFF |
| 11. | SLOW | FINE | DARK | OFF | OFF | OFF | OFF |
| 12. | SLOW | COARSE | DARK | OFF | WEAK | OFF | OFF |

TABLE 2

HIGH BIT RATE TRANSMISSIONS

| | | | | PRE-FILTER 101 | | PRE-FILTER 102 | |
|---|---|---|---|---|---|---|---|
| ITEM | MOTION | TEXTURE | LUMINANCE | TIME FILTER 301 | SPATIAL FILTER 400 | TIME FILTER 301 | SPATIAL FILTER 400 |
| 1. | FAST | FINE | LIGHT | OFF | OFF | ON | OFF |
| 2. | FAST | COARSE | LIGHT | OFF | OFF | ON | OFF |
| 3. | FAST | FINE | DARK | OFF | OFF | OFF | OFF |
| 4. | FAST | COARSE | DARK | OFF | OFF | OFF | OFF |
| 5. | MEDIUM | FINE | LIGHT | OFF | OFF | ON | OFF |
| 6. | MEDIUM | COARSE | LIGHT | OFF | OFF | ON | OFF |
| 7. | MEDIUM | FINE | DARK | OFF | OFF | OFF | OFF |
| 8. | MEDIUM | COARSE | DARK | OFF | OFF | OFF | OFF |
| 9. | SLOW | FINE | LIGHT | OFF | OFF | ON | OFF |
| 10. | SLOW | COARSE | LIGHT | OFF | OFF | ON | OFF |
| 11. | SLOW | FINE | DARK | OFF | OFF | OFF | OFF |
| 12. | SLOW | COARSE | DARK | OFF | OFF | OFF | OFF |

Table 1 identifies the type of filtering performed by filters 301 and 400 of both pre-filters 101 and 102 for various characteristics of a video signal having a low transmission bit rate. As shown in Table 1, time filter 301 of pre-filter 101 is "on" when the luminance level of the video signal (having a low transmission bit rate) is "light", that is, when the luminance level of the image is relatively low. On the other hand, when the luminance level is "dark", time filter 301 of pre-filter 101 is "off" (i.e., not filtering) since, as previously discussed, viewer sensitivity of after-images in dark images is relatively high. Thus, time filtering of a video signal in noise reducer circuit 301 of pre-filter 101 is established based on the detected luminance level of the video signal.

Spatial filter 400 of pre-filter 101, as shown in Table 1, generally is controlled by the amount of motion in the video signal when the motion is relatively high (i.e., fast) or relatively average (i.e., medium), and is controlled by the degree of texture of the video image when the amount of motion is slow. When spatial filter 400 of pre-filter 101 is highly or "strongly" filtering the video signal supplied thereto, the amount of data included in the resultant encoded video signal is reduced. In addition, spatial filter 400 of pre-filter 101 changes the fineness of the texture in the video image, and since texture is less discernable in fast motion video images, filter 400 safely can filter the video signal with a high or strong filter characteristic without diminishing the picture quality of the resultant encoded video signal. Similarly, spatial filter 400 of pre-filter 101 filters the video signal using a medium filter characteristic for video signals having average motion therein, and filters the video signal using a "weak" filter characteristic with coarsely textured images that have slow motion therein. However, spatial filter 400 of pre-filter 101 is controlled to not filter the video signal when its texture is fine and when little or no motion is detected therein.

Time filter 301 and spatial filter 400 of pre-filter 102 filter a video signal that is subsequently supplied to motion detector 105. It is appreciated that the second filtered video signal S22 supplied from pre-filter 102 is not per se encoded to produce the resultant encoded video signal S24, but is utilized for motion detection purposes only. Time filter 301 of pre-filter 102 is controlled by the amount of luminance level of the video signal. When the luminance level of a video signal having a low transmission bit rate is low (i.e., "light"), time filter 301 of pre-filter 102 filters the video signal so that noise is removed therefrom thus preventing erroneous detection of that noise in ME unit 105. On the other hand, when the luminance level of the video signal is "dark", time filter 301 of pre-filter 102 does not filter the video signal therein so as to increase (or actually, not decrease) the motion detection precision of ME unit 105.

Spatial filter 400 of pre-filter 102, as shown in table 2, is controlled to not spatially filter the video signal supplied thereto when the video signal is transmitted at a low bit rate so that the motion detection precision of ME unit 105 is not reduced.

As previously discussed, time filter 301 and spatial filter of pre-filter 101 operate, when filtering, to reduce the number of bits in the resultant encoding video signal so that the transmission bit rate thereof does not exceed that of the encoding apparatus. Further, if grain noise is included in a video image transmitted at a low bit rate, time filter 301 operates to remove the grain noise therefrom in the "time dimension" and spatial 400 of pre-filter 101 is controlled to not remove the grain noise therein while filtering the video signal so as to prevent block distortion in the resultant encoded video signal.

Referring now to Table 2, the filter characteristics of time filter 301 and spatial filter 400 of both pre-filters 101 and 102 for the various characteristics of a video signal transmitted at a high bit rate is shown. For video signals having a high transmission bit rate, both time filter 301 and spatial filter 400 of pre-filter 101 are controlled to not filter the video signal supplies thereto and to simply pass therethrough the video signal to hybrid encoder 104. Similarly, spatial filter 400 of pre-filter 102 is controlled to not spatially filter the video signal supplied thereto. Time filter 301 of pre-filter 102 however is controlled to filter in the time direction the video signal supplied thereto only when the luminance level of the video signal is "light". Similar to the operation of the encoding apparatus of the present invention when it receives a video signal transmitted at a low bit rate, time filter 301 of pre-filter 102 removes noise, including grain noise, from video signals having a light luminance level so that ME unit 105 does not erroneously detect the noise as representing motion in the video signal. As previously discussed, video signals transmitted at a low bit rate that are encoded (without pre-filtering) may result in an encoded video signal that has a transmission bit rate that exceeds a desired bit rate or the transmission bit rate of the encoding apparatus. However, since there generally is no risk of exceeding a desired bit rate when a video signal having a high bit rate is encoded (without filtering), time filter 301 and spatial filter 400 of pre-filter 101 are controlled to not filter the video signal supplied thereto. Further, by not filtering the video signal that is supplied to hybrid encoder 104, the degree of texture of the video signal, as well as the amount of grain noise therein, is not reduced thus producing an encoded video signal without deteriorating the quality of the video picture represented thereby. It is also seen that for video signals having a high transmission bit rate that have a low (dark) luminance level, time filter 301 is turned "off" so that the motion detection precision of ME unit 105 is not reduced.

Although both pre-filters 101 and 102 have the same block structure, such as shown in FIG. 3, they operate quite differently and are controlled in the manner shown in Tables 1 and 2 in response to the characteristic signal supplied from characteristic detector 110, as will be discussed.

Figure 4:
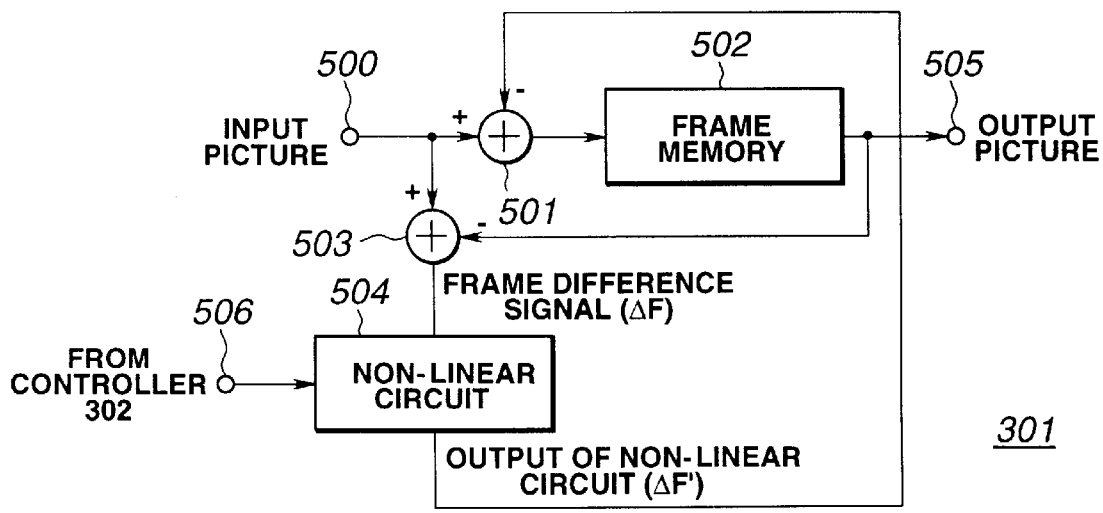
FIG. 4 is a block diagram of noise reducer 301 shown in FIG. 3.
Figure 5:
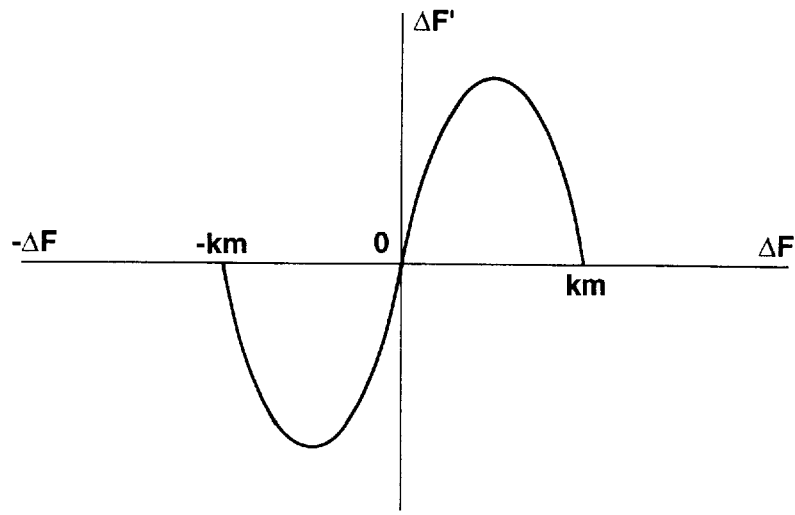
FIG. 5 schematically illustrates the various values of $K_m$ used by noise reducer 301.

FIG. 4 is a block diagram of noise reducer 301 which, as shown, is comprised of difference circuits 501 and 503, a frame memory 502, and a non-linear circuit 504. Noise reducer 301 (i.e., time filter 301) is a recursive filter which employs a single frame memory in order to average the amount of noise in the moving picture signal. The video signal supplied to noise reducer 301 is supplied at input terminal 500 and then to both difference circuits 501 and 503. The output of difference circuit 501 is supplied to frame memory 502 which stores a frame therein and operates as a frame delay, and outputs a previously stored frame at the same time a current frame is supplied to difference circuit 503. Frame memory 502 supplies the previous frame stored therein to difference circuit 503 which detects differences between the currently supplied frame (from terminal 500) and a previously supplied frame (from memory 502) to produce a difference signal $\Delta F$ which represents differences therebetween and supplies difference signal $\Delta F$ to nonlinear circuit 504. Nonlinear circuit 504 has a nonlinear characteristic, as shown in FIG. 5, and which supplies an output $\Delta F'$ which is a function of $\Delta F$ and the of value of the controllable variable $K_m$. As shown in FIG. 5, the greater the value of $K_m$, the greater the amount of noise that is removed from the video signal, wherein no noise is removed when $K_m$ equals 0. $K_m$ thus identifies the maximum amplitude of the reducible noise in the video signal and is supplied from controller 302 and generated in response to the various characteristics of the input video signal, as previously discussed with reference to Tables 1 and 2.

Nonlinear circuit 501 supplies signal $\Delta F'$ to difference circuit 501 which differences the input video signal and $\Delta F$ (i.e., for each pixel) to produce a video image which noise components are removed therefrom in proportion to the magnitude of $\Delta F$ and which is stored in frame memory 502. The filtered frame stored in memory 502 is supplied as an output at output terminal 505 and the filtered video signal then is supplied to spatial filter 400.

Figure 6:
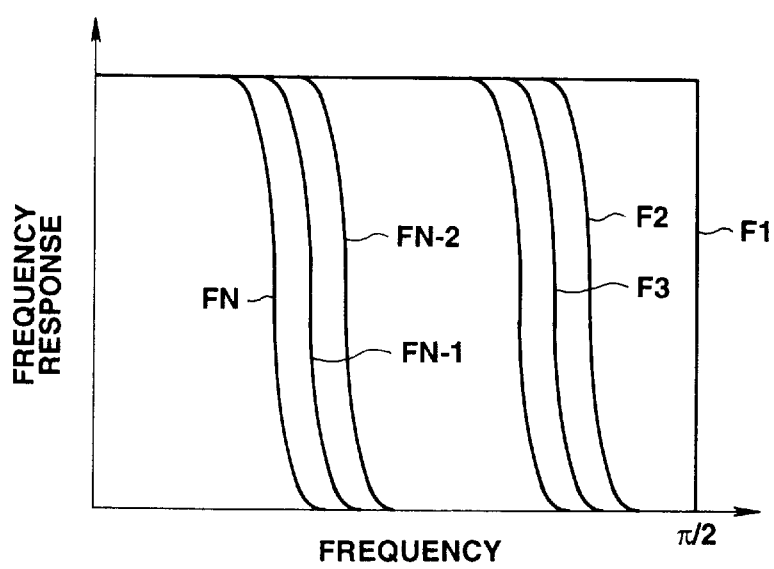
FIG. 6 schematically illustrates the frequency characteristics of spatial filter 400 shown in FIG. 3.

Spatial filter 400 is operable to remove high frequency noise from the video signal and has a variable filter characteristic that is shown in FIG. 6. Spatial filter 400 is controllable to have any one of frequency characteristics F1 to FN, wherein frequency characteristic F1 corresponds to no filtering of the video signal. Frequency characteristic FN, on the other hand, corresponds to the greatest amount of filtering of the video signal thus allowing only the lowest frequency components to pass. Controller 401 supplies a control signal to spatial filter 400 which controls which filter characteristic F1 to FN is utilized. Controllers 302 and 401 of the pre-filter shown in FIG. 3 can be any appropriate control circuit which converts appropriate characteristic signals from characteristic detector 110 supplied thereto to appropriate control signals supplied to noise reducer 301 and spatial filter 400.

Figure 7:
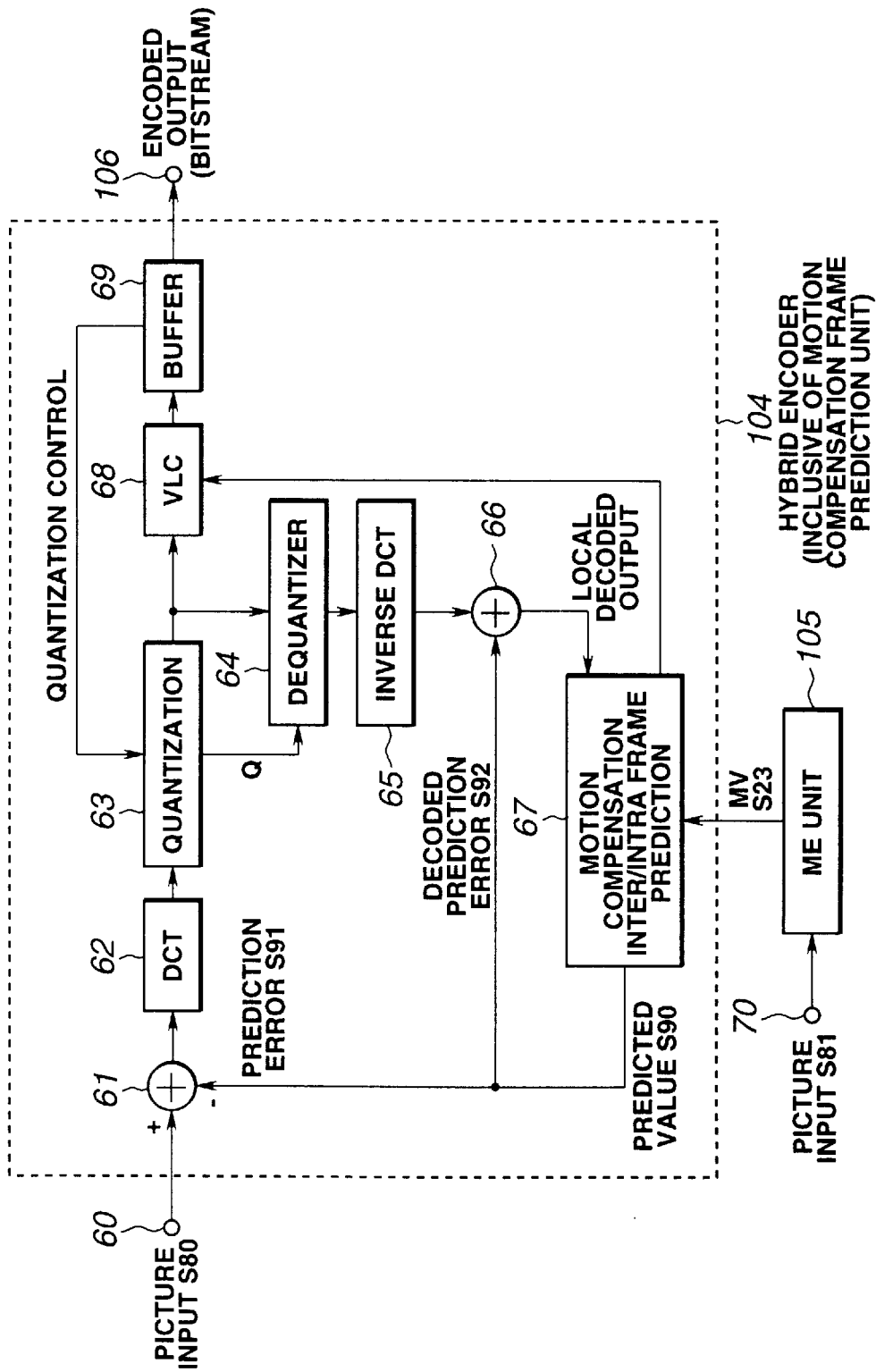
FIG. 7 is a block diagram of encoding circuit 103 shown in FIG. 2.

Referring next to FIG. 7 of the drawings, a block diagram of encoding circuit 103 shown in FIG. 2 is shown. Hybrid encoder 104 included in the encoding circuit is comprised of a difference circuit 61, a discrete cosine transformation (DCT) circuit 62, a quantization circuit 63, a dequantizer 64, an inverse DCT circuit 65, an adder 66, a motion compensation circuit 67, a variable length encoding (VLC) circuit 68 and a buffer 69. The respective operations and functions of circuit 62, 63, 64, 65, 68 and 69 are well-known in the art, and therefore, description thereof is omitted herein except where necessary for an understanding of the present invention.

Figure 8:
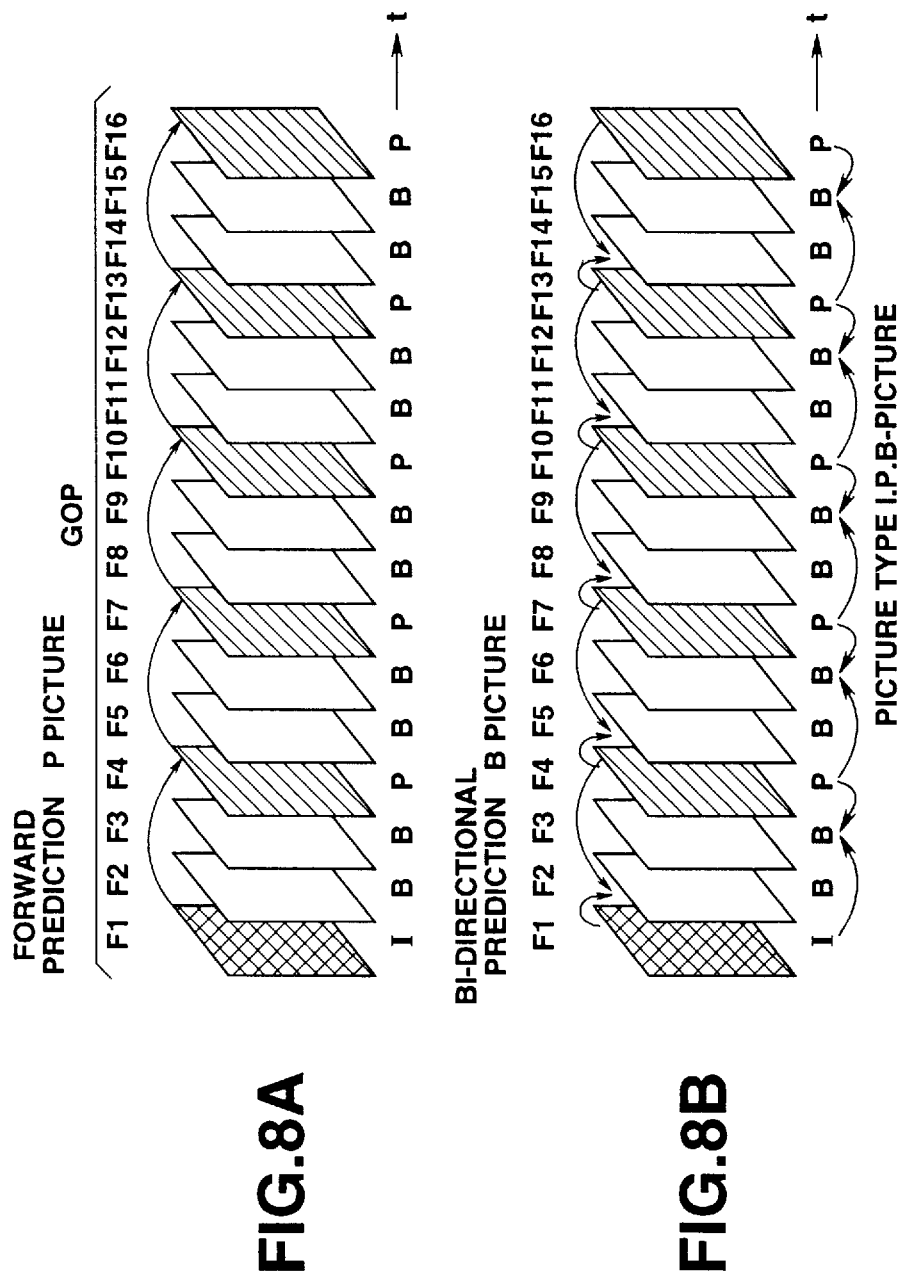
FIGS. 8A and 8B schematically illustrate the frame encoding pattern in a group of pictures (GOP)

Encoding circuit 103 produces from the first filtered video signal supplied thereto an encoded video signal which includes intraframe encoded images (I-frames) and interframe encoded images (P-frames and B-frames). Each I-frame is encoded by utilizing the data of only one frame, whereas P and B-frames are encoded utilizing the data of two or more frames in the video signal. To encode a P-frame, a previous I or P-frame is used as a prediction picture (commonly called a reference frame) and a prediction residual signal is encoded as the P-frame. FIGS. 8a and 8b illustrate the data structure of a group of pictures (GOP) which is comprised of one I-frame followed by plural B- and P-frames. FIG. 8a illustrates the "flow" of prediction for forward predictive encoding and FIG. 8b illustrates the flow of prediction for bi-directional predictive encoding.

Returning to FIG. 7, the second filtered video signal supplied from pre-filter 102 is supplied to input terminal 70 and then to ME unit 105 which detects motion therein using successive frames of the video signal in a manner well known in the art and produces a motion vector S23 corresponding to the detected motion. Motion detection may be accomplished by matching patterns in a reference frame and in a current block consisting of 16 pixels by 10 lines. Namely, arbitrary motion vectors are used and the ME unit sums the absolute values of differences between a signal $BP_{ij}$ of a current block and a signal $BR_{ij}$ of a block that is referred to by an arbitrary motion vector, such as by utilizing equation 1, and ME unit 105 supplies as motion vector S23 the motion vector which minimizes the value of $BP_f$.

$$BP_f = \Sigma |BP_{ij} - BR_{ij}| \qquad (1)$$

The first-filtered video signal S21 supplied from pre-filter 101 is supplied to input terminal 60 and then to difference circuit 61 which differences a currently supplied frame of the video signal and a motion compensated predictive frame output from circuit 67. The difference signal is supplied to DCT circuit 62 and quantizer 63 which transform and quantize the difference signal in a manner well known in the art and the resultant signal is variable length encoded in circuit 68 and stored in buffer 69. Buffer 69 supplies to output terminal 106 the encoded video signal and also supplies a control signal to quantizer 63 to control the amount of quantization therein. Quantizer 63 also supplies the quantized signal to dequantizer 64 and then to inverse DCT circuit 65 which restore the difference signal output from difference circuit 61. Adder 66 adds the restored difference signal and the signal output from circuit 67 to produce a locally decoded output signal and which supplies the locally decoded output signal to circuit 67 which predicts a frame using the motion vector supplied thereto.

Figure 9:
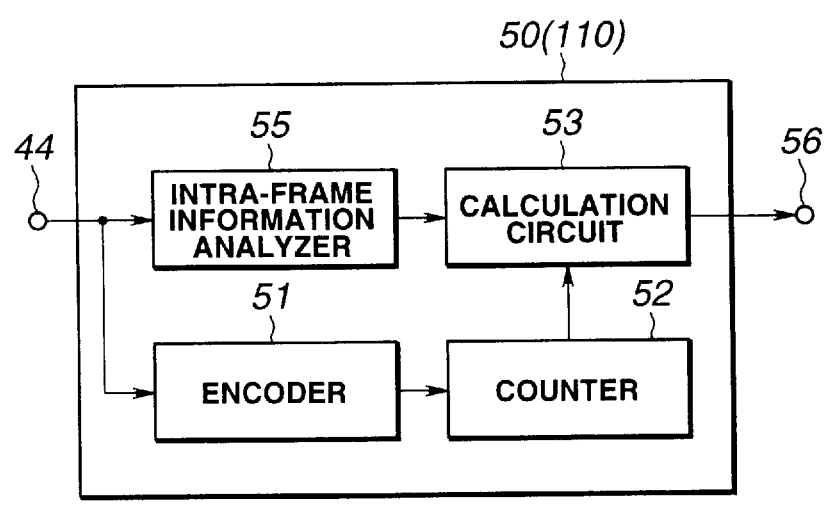
FIG. 9 is a block diagram of characteristic detector 110 shown in FIG. 2.

FIG. 9 is a block diagram of characteristic detector 110 (shown in FIG. 2) which, as shown, is comprised of an encoder 51, a counter 52, a calculation circuit 53, and an intraframe information analyzer 55. Characteristic detector 110 (also identified as characteristic detector 50 in FIG. 9) detects the amount of motion in the video signal, the transmission bit rate of the video signal, the amount of texture, and the luminance level of the video signal. In an alternative embodiment of the present invention, the transmission bit rate is supplied separately, e.g., by a user or included as separate data in the video signal. The transmission bit rate also may be ascertained by quantizing the video signal at a fixed quantization step size and encoding the resultant quantized signal, to be discussed.

A video signal supplied to input terminal 44 is supplied to both encoder 51 and analyzer 55. Encoder 51 is similar to the encoding circuit shown in block diagram form in FIG. 7, but encoder 51 repetitively encodes the video signal using a pre-set frame pattern in each group of pictures, e.g., using the pre-set pattern of I, B, B, P, B, B, P, B, B, P, B, B, P, etc., and quantizes the video signal at a fixed quantization step size. Thus, the quantization control signal of FIG. 7 is not required. Encoder 51 encodes the video signal and supplies the encoded video signal to counter 52 which counts the number of bits in the resultant encoded signal and which supplies the counted number of bits to calculation circuit 53.

Analyzer 55 ascertains the mean luminance level of the supplied video signal by, for example, dividing the sum of the pixel value levels in each frame by the number of pixels therein, and which supplies the average luminance level to calculation circuit 53. Calculation circuit 53 includes therein a memory which stores the count value supplied from counter 52 as well as the average luminance level supplied from analyzer 55. Calculation circuit 53 sums the bit values of each pixel in, for example, a frame by utilizing the stored count value so as to calculate an amount of generated bits for each frame. Calculation circuit 53 sums the amount of generated bits for each picture type in the pre-set domain, that is, the amount of bits included in all of the I-frames, all of the P-frames, and all of the B-frames, in a pre-set domain are ascertained. In addition, calculation circuit 53 ascertains the ratio of bits included in each frame type, as well as the average amount therein.

Figure 10:
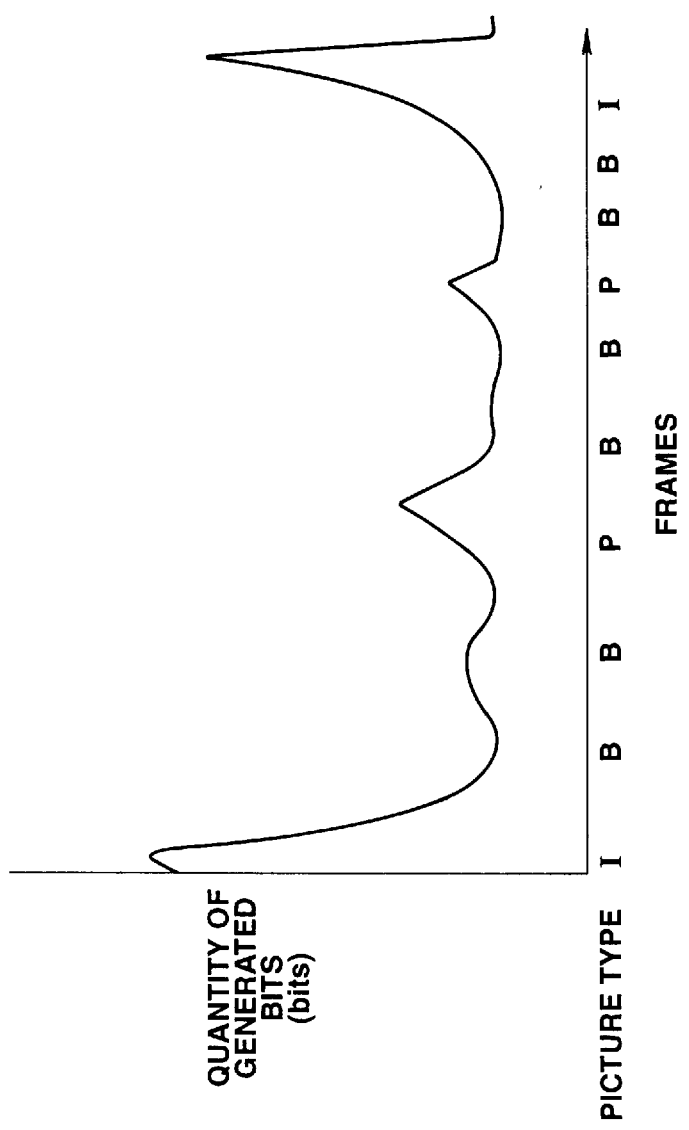
FIG. 10 schematically illustrates the amount of data included in the frames of a pre-set domain.
Figure 11:
FIG. 11 schematically illustrates the relationship between the amount of data in I, P and B frames included in a video signal when motion therein is relatively large.
Figure 12:
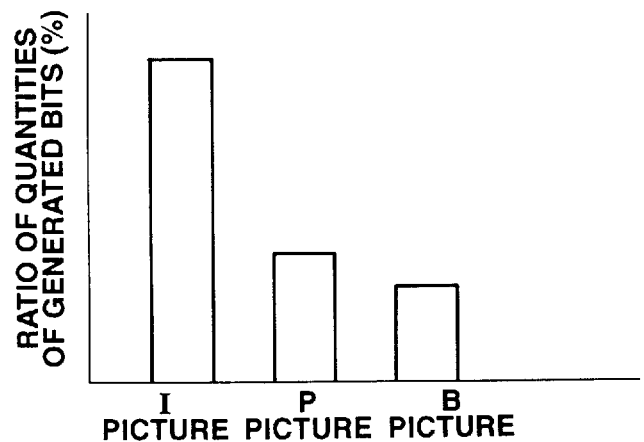
FIG. 12 schematically illustrates the relationship between the amount of data in I, P and B frames when motion in a video signal is relatively small.

FIG. 10 is a schematic diagram of the amount of data included in each frame of a pre-set domain, as ascertained in calculation circuit 53. Also, calculation circuit 53, as previously mentioned, ascertains an amount ratio of bits in each of the types I, P and B of the frames in a pre-set domain. FIG. 11 illustrates the approximate ratio of the number of bits in the I, P and B frames wherein the number of bits therein are approximately in equal proportions which represents that there is a relatively large amount of motion in the video signal. FIG. 12, on the other hand, illustrates a ratio of the number of bits in I, P and B frames in a pre-set domain having relatively little motion.

Calculation circuit 53 further ascertains the amount of luminance in the frames of a pre-set domain from the summation of the intra-frame (I-frame) average luminance levels and the number of frames in the pre-set domain using equations 2, 3 and 4, shown below.

$$Y\_pix = FW \times FH \qquad (2)$$

$$DC(n) = \left( \sum_{y=0}^{FH} \sum_{x=0}^{FW} Y(x,y) \right) / Y\_pix \qquad (3)$$

$$ave\_dc = \sum_{n=0}^{num} DC(n)/num \qquad (4)$$

In equations 2–4, DC(n) represents the average luminance of frame n, Y(x,y) is the value of a luminance level of a coordinate (x,y), FW represents the horizontal frame size, FH represents the vertical frame size, Y_pix is the number of Y pixels in the frame, num is the number of frames in a pre-set domain, and ave_dc is the average luminance level of the pre-set domain.

Calculation circuit 53 further is operable to ascertain the transmission bit rate of the video signal, which may vary from frame to frame, and which is function of the count value supplied from counter 52. Since the quantization step size in encoder 51 is fixed (i.e., known), the transmission bit rate is detectable. Namely, counter 52 ascertains the amount of data in a pre-set domain, and calculation circuit 53 ascertains the "frame-based" encoding bit rate, which is the same as the transmission bit rate, from the ratio of the amounts of resultant encoded bits of each of the picture types, the average amount of encoded bits, and the average luminance level of each frame as supplied from analyzer 55.

As previously discussed, FIGS. 11 and 12 illustrate different ratios of I, P and B frames representing video signals having a large and a small amount of motion, respectively.

Figure 13:
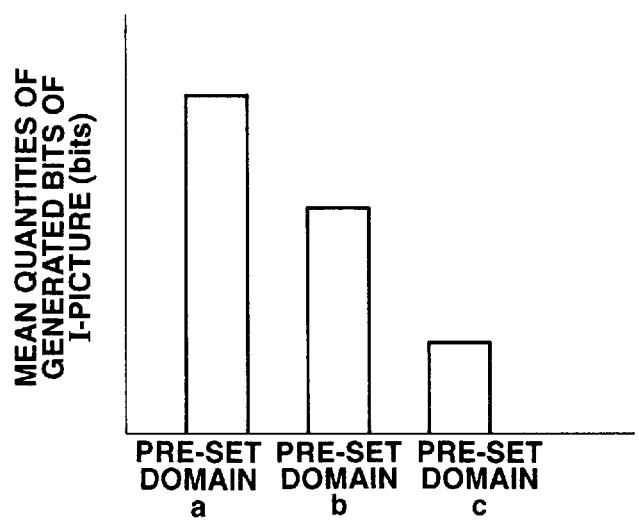
FIG. 13 schematically illustrates the amount of data in various pre-set domains.

FIG. 13 illustrates the amount of resultant encoded bits of the I-frames of three different pre-set domains a, b and c, wherein a relatively small amount of bits, such as with pre-set domain c, indicates that the video picture is relatively course in texture. On the other hand, a relatively large amount of bits, such as with pre-set domain a, indicates that the video picture is relatively fine in texture.

The data ascertained in calculation circuit 53 is output at output terminal 56 as the character signal previously mentioned which is supplied to both pre-filters 101 and 102.

Figure 14:
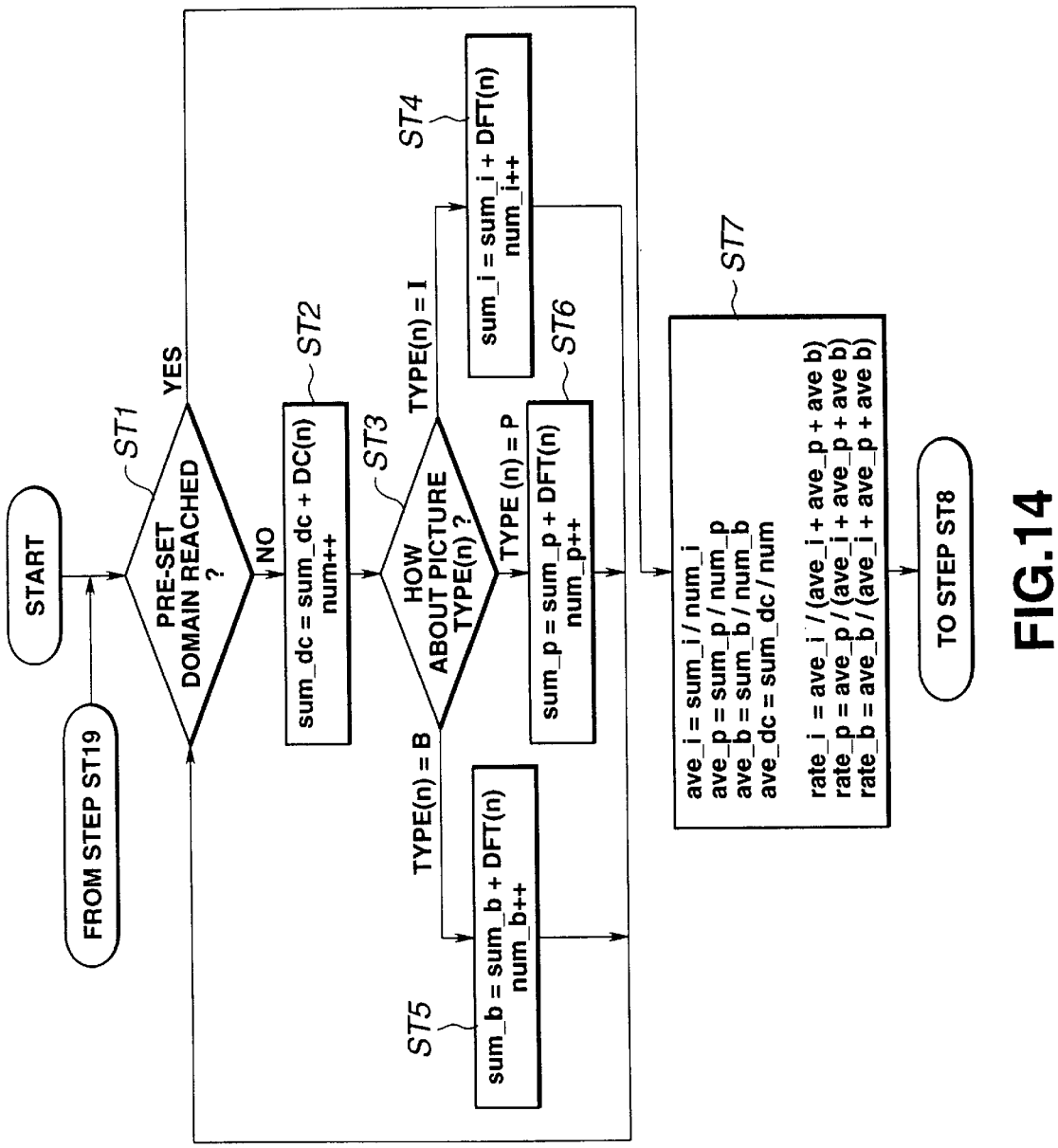
FIG. 14 is a flow chart showing the operation of characteristic detection 110 shown in FIG. 9.
Figure 15:
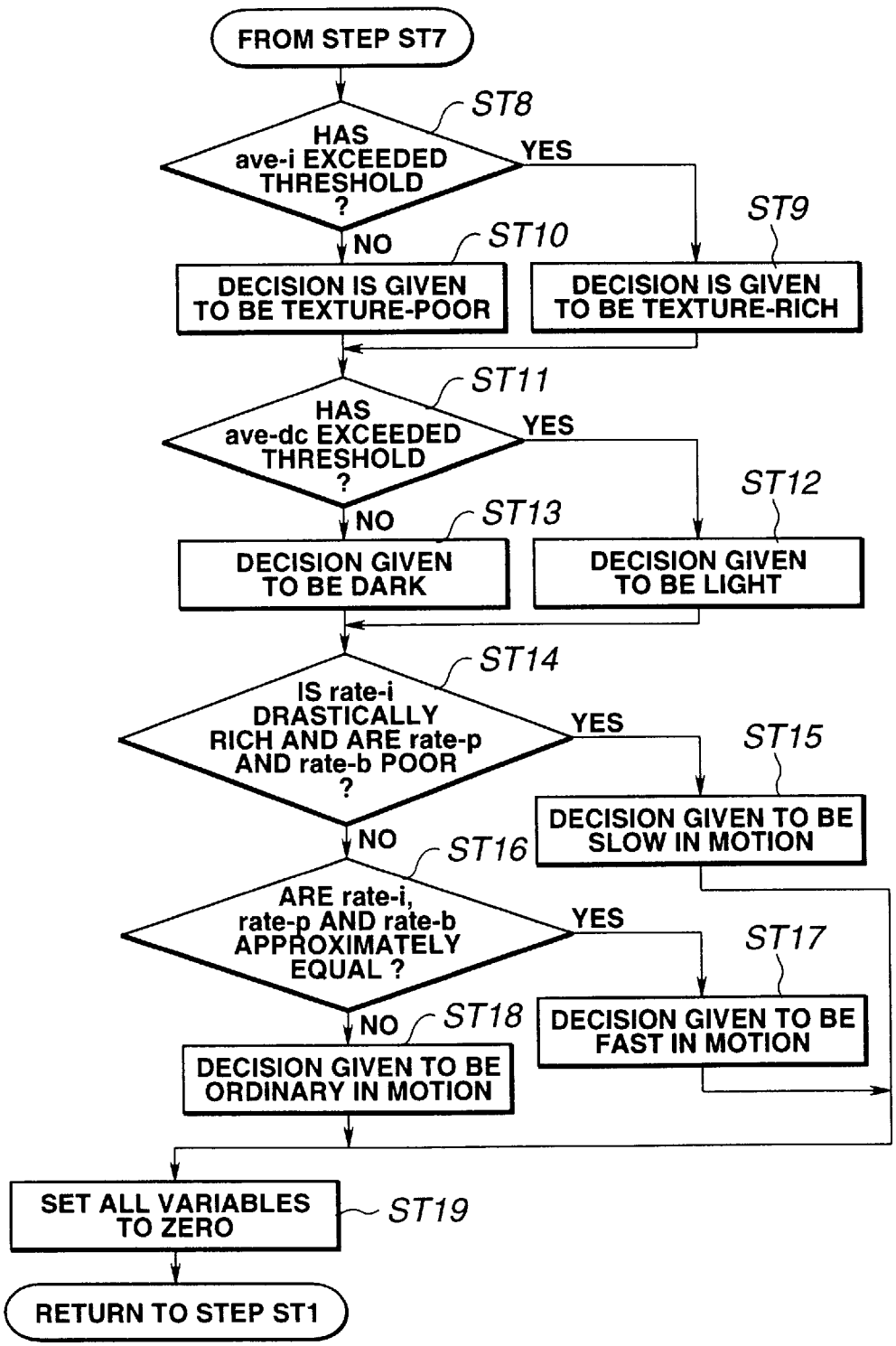
FIG. 15 is a flow chart showing the continued operation of characteristic detector 110.

Referring next to FIGS. 14 and 15, a flow chart showing the operation of calculation circuit 53 of characteristic detector 110 in accordance with the present invention is shown. To further understand the flow chart of FIGS. 14 and 15, the following definitions are provided:

DC(n) is the average luminance level of frame n;

DFT(n) is the amount of data (i.e., bits) of frame n;

Type(n) identifies the picture type (i.e., I, P or B) of frame n;

sum_dc is the sum of the average intra-frame luminance values;

ave_dc is the average intra-frame luminance level;

num is the number of frames in a pre-set domain;

num_i is the number of I-frames;

num_p is the number of P-frames;

num_b is the number of B-frames;

sum_i is the total number of I-frame bits sum_p is the total number of P-frame bits sum_b is the total number of B-frame bits ave_i is the average number of bits in each of the I-frames;

ave_p is the average number of bits in each of the P-frames;

ave_b is the average number of bits in each of the B-frames;

rate_i is the bit rate of I-frames;

rate_p is the bit rate of P-frames; and rate_b is the bit rate of B-frames.

Referring first to FIG. 14, calculation circuit 53 determines whether the end (or the beginning) of a pre-set domain is reached at inquiry ST1. If not, the average luminance level of frame n is added to sum_dc and the frame number is incremented by one at instruction ST2, and it is determined, at inquiry ST3, whether frame n is an I, P or B frame. When frame n is an I-frame, the number of bits included in frame n is added to sum_i, and the number of I-frames num_i is incremented by one at instruction ST4. When frame n is a P-frame, the number of bits included in frame n is added to sum_p, and the number of P-frames num_p is incremented by one at instruction ST6. Similarly, when frame n is a B-frame, the number of bits included in frame n is added to sum_b, and the number of B-frames num_b is incremented by one at instruction ST5.

After instruction ST4, ST5 or ST6 is executed, it is determined whether the end of the pre-set domain is reached at instruction ST1. When the end of the pre-set domain is reached, sum_i, sum_p and sum_b represent the total number of bits of all of the I, P and B frames in a pre-set domain, and num_i, num_p and num_b represent the number of I, P and B-frames in the pre-set domain. In addition, sum_dc is the sum of each frame's average luminance level, and num is the total number of frames in the pre-set domain. Then, the average number of bits in each I, P and B frame, the average intraframe luminance level ave_dc, and the bit rate of each type of frame are ascertained at instruction ST7, as shown.

Referring now to FIG. 15, the operation of the flow chart continues at inquiry ST8 whereat it is determined whether ave_i, the average number of bits of each I-frame in the pre-set domain, exceeds a predetermined threshold value, and if so, it is determined that the pre-set domain is "texture-rich", that is, the pre-set domain has a fine texture, at instruction ST9. If not, it is determined that the pre-set domain is "texture-poor" or coarse in texture at instruction ST10. The operation proceeds to inquiry ST11 whereat it is determined whether ave_dc, the average value of the average intra-frame luminance level, exceeds a predetermined threshold level, and if so, the pre-set domain is considered to have a "light" luminance level at instruction ST12, and if not, the pre-set domain is considered to have a "dark" luminance level at instruction ST13.

Then, at inquiry ST14, it is determined whether the I-frame bit rate is relatively large while the P and B-frame bit rates are relatively small. If so, it is determined that the pre-set domain has little motion or "slow" motion at instruction ST15, but If not, it is determined whether the I, P and B bit rates are approximately the same in inquiry ST16. If the bit rates are approximately the same, it is determined that the motion in the pre-set domain is high or "fast" at instruction ST17, but if the bit rates are not approximately the same, it is determined that the motion in the pre-set domain is average or "ordinary" at instruction ST18.

The operation then continues at instruction ST19 whereat all of the stored values are set to zero before returning back to step ST1 for the next pre-set domain in the video signal.

Figure 1:
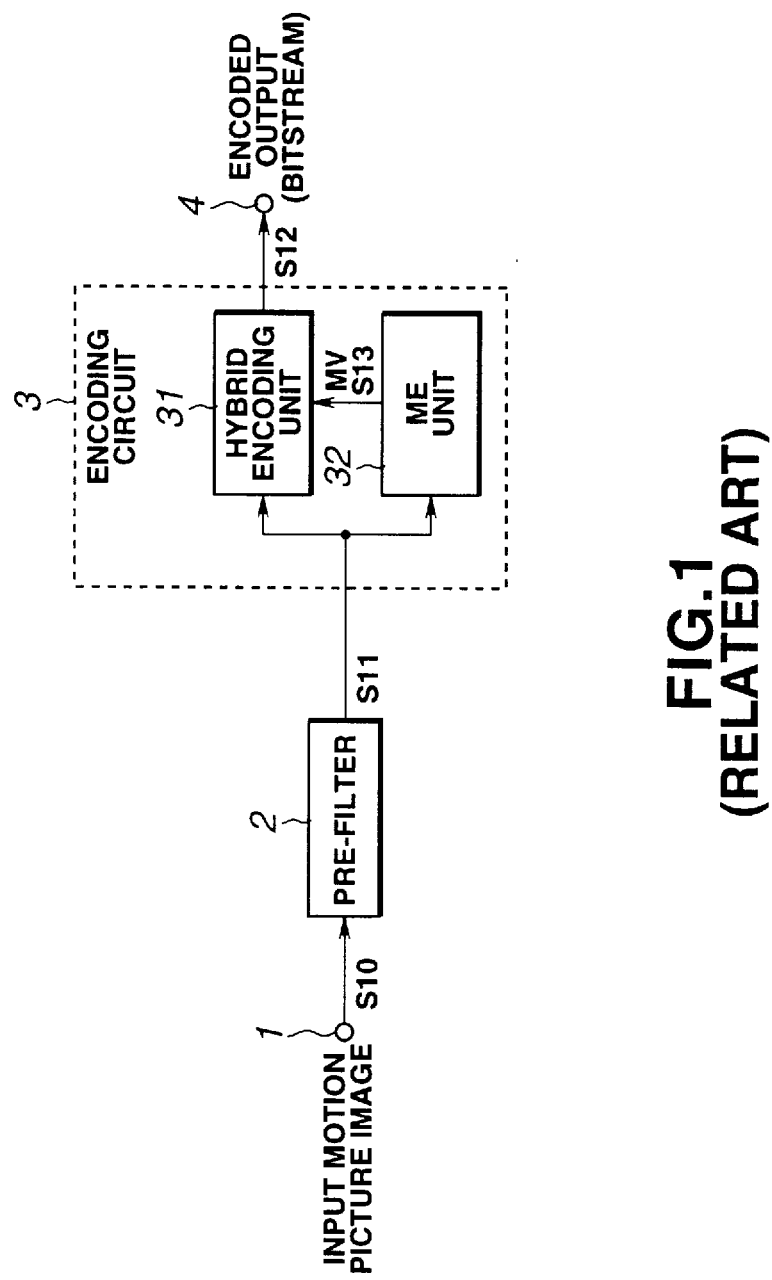
FIG. 1 is a block diagram of an encoding apparatus.
Figure 16:
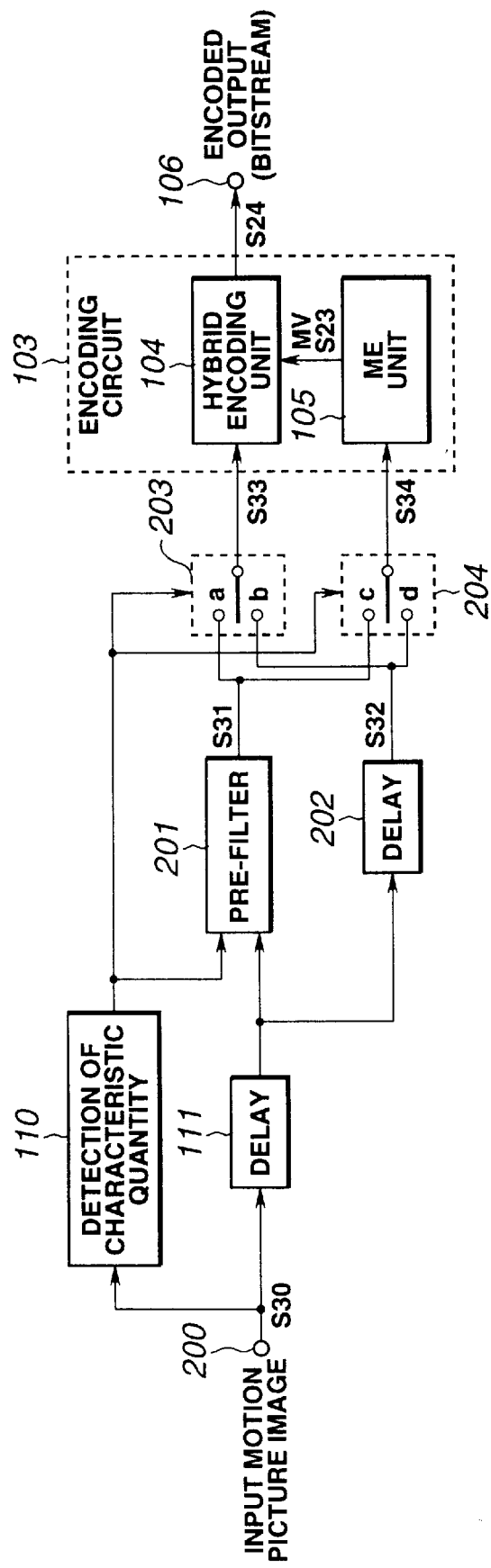
FIG. 16 is a block diagram of apparatus for encoding a digital video signal in accordance with another embodiment of the present invention.

Referring next to FIG. 16, a block diagram of apparatus for encoding a digital video signal in accordance with another embodiment of the present invention is shown, wherein the block diagram of FIG. 16 is similar to the block diagram of FIG. 1 except only one pre-filter 201 is utilized along with a second delay circuit 202 and switches 203 and 204. A video signal supplied to input terminal 200 is supplied to both characteristic detector 110 and delay 111. Characteristic detector 110 and delay 111 operate in the manner previously discussed except that characteristic detector 110 also supplies a switching signal to switches 203 and 204 to control the switches as a function of the characteristics detected therein. Delay 202 delays the output of delay 111 by an amount of time corresponding to the inherent delay of pre-filter 201. The outputs of switches 203 and 204 are supplied to hybrid encoder 104 and ME unit 105, respectively.

The operation of the encoding apparatus shown in FIG. 16 will be discussed with reference to a video signal derived from a film source. For a video signal having a high transmission bit rate, characteristic detector 110 controls switch 203 to supply the output of pre-filter 201 (S31) to ME unit 105, and controls switch 204 to supply the delayed video signal output from delay 202 to hybrid encoder 104. As shown in table 2, previously discussed, both time filter 301 (i.e., noise reducer 301) and spatial filter 400 of pre-filter 101 are turned "off", which is equivalent to supplying the video signal directly to hybrid encoder 104 in the encoding apparatus of FIG. 16. Further, time filter 301 (of pre-filter 201) is controlled to remove grain noise from the video signal, but the spatial filter (of pre-filter 201) is controlled to not spatially filter any noise therefrom so that the video signal is passed therethrough before it is supplied via switch 204 to ME unit 105. Pre-filter 201 thus effectively removes grain noise from the video signal so that it is not erroneously detected to represent motion in the video signal by ME unit 105. Further, since the video signal is transmitted at a high bit rate, filtering thereof is not required prior to its encoding.

For a video signal having a low transmission bit rate, characteristic detector 110 controls switch 203 to supply the output of pre-filter 201 (S31) to ME unit 105, and controls switch 204 also to supply the output of pre-filter 201 to hybrid encoder 104. Characteristic detector 110 further controls time filter 301 of pre-filter 201 to remove grain noise from the video signal and controls spatial filter 400 of pre-filter 201 to render block distortion in the video signal "invisible" in the resultant encoded video signal. Thus, filter 400 is established to highly or "strongly" filter the video signal when the bit transmission rate is low.

Figure 17:
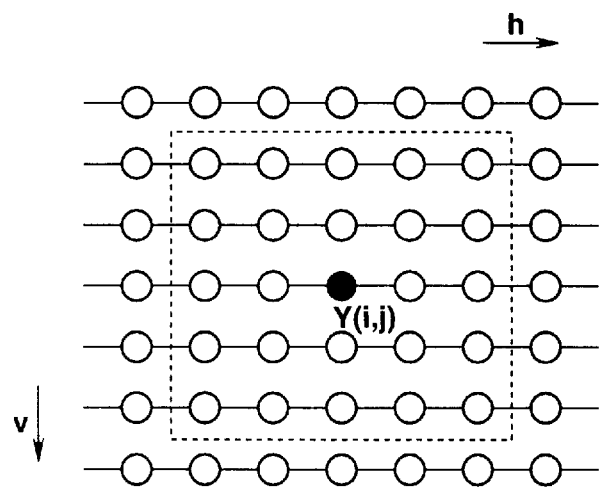
FIG. 17 schematically illustrates a block of pixels.

The above-discussed embodiments have been described herein with reference to units of video frames, but the present invention is not limited to encoding data in frame units. For example, the above-discussed filters may be controlled on the basis of each pixel or a block of pixels in the video signal, wherein deterioration caused by certain filtering and encoding is apparent only in selected (spatial) portions of a frame. For example, a light portion of a frame may be susceptible to deterioration while a dark portion of the same frame is not. Referring to FIG. 17, a block of pixels is shown wherein DC_ij represents the average luminance level of an N×N block of pixels, VAR_ij represents the variance value (i.e., complexity level), and Y(i,j) is the luminance level of the center coordinate. Equations 5 and 6 show how the values of DC_ij and VAR_ij, respectively, are calculated, wherein N=2 in the example of FIG. 17, which is shown by the dotted line.

$$DC\_ij = \left\{ \sum_{h=i-N}^{i+N} \sum_{v=j-N}^{j+N} Y(h,v) \right\} / ((2N+1)*(2N+1)) \quad (5)$$

$$VAR\_ij = \sum_{h=i-N}^{i+N} \sum_{v=j-N}^{J+N} (Y(h,v) - DC\_ij) * (Y(h,v) - DC\_ij) \quad (6)$$

Figure 18:
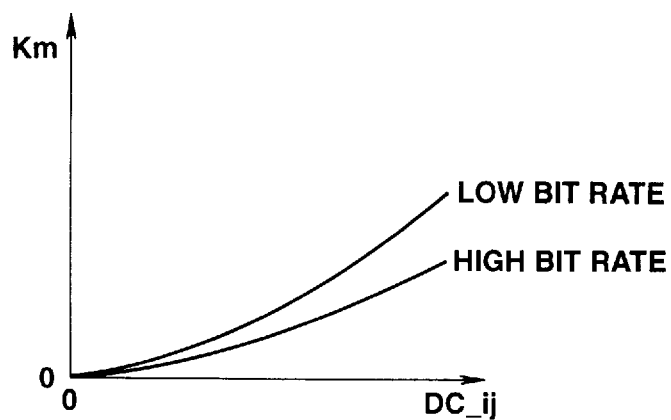
FIG. 18 is a schematic diagram of a filter characteristic of noise reducer 301 included in pre-filter 101 shown in FIG. 2.
Figure 19:
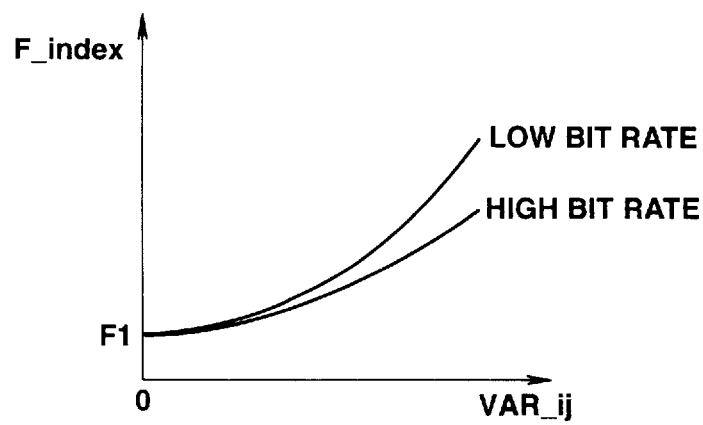
FIG. 19 is a schematic diagram of a filter characteristic of spatial filter 400 of pre-filter 101.

The average luminance level DC_ij and the variance VAR_ij are calculated for each of the luminance pixels in a frame wherein the larger the value of DC_ij, the lighter the picture, but the larger the value of VAR_ij, any distortion in the encoded picture becomes more apparent. The operation of controlling pre-filter circuits 101 and 102 shown in FIG. 2 for units of blocks of pixels in a frame will now be described. For a video signal having a high transmission bit rate, noise reducer 301 of pre-filter 101 is controlled to not filter the video signal therein or, alternatively, is controlled to filter the video signal with a filter characteristic such as shown in FIG. 18. Namely, the degree of noise removal increases (i.e., $K_m$ increases) as DC_ij increases. In other words, $K_m$ is low for darker portions of a frame and high for lighter portions of a frame and, therefore, noise reducer 301 of pre-filter strongly filters dark areas so as to prevent after-images from appearing in the resultant encoded video signal. Further, controller 401 (FIG. 3) controls spatial filter 400 of pre-filter 101 to not spatially filter the video signal or, alternatively, controls spatial filter 400 to filter the signal based on the value of VAR_ij, such as shown in FIG. 19. As shown, the y-axis of F_index represents the frequency characteristic discussed with reference to FIG. 6, i.e., the frequency response of the spatial filter in the first discussed embodiment. As the variance VAR_ij increases (i.e., as the complexity of the frame increases), the greater the filtering of the video signal (i.e., the F index increases) resulting in the lowering of the frequency components that are passed.

Figure 20:
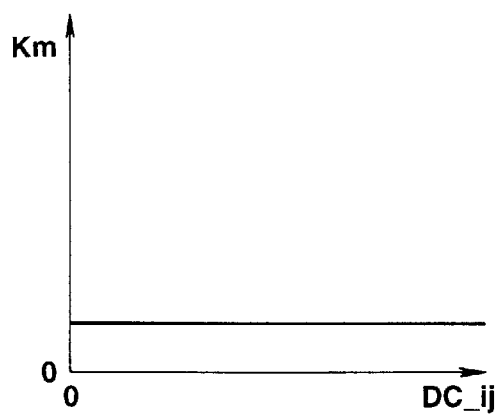
FIG. 20 is a schematic diagram of a filter characteristic of noise reducer 301 included in pre-filter 102.
Figure 21:
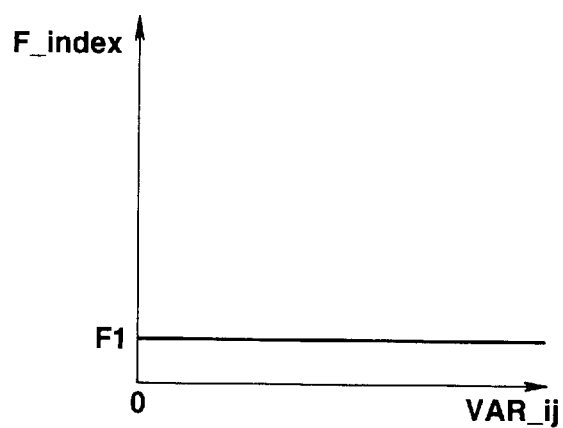
FIG. 21 is a schematic diagram of a filter characteristic of spatial filter 400 included in pre-filter 102.

Still further, for a video signal having a high transmission bit rate, noise reducer 301 of pre-filter 102 is controlled independent of the average luminance level DC_ij, such as shown in FIG. 20. As previously discussed, noise reducer 301 of pre-filter 102 is controlled to remove grain noise from the video signal before motion is detected therein. Also, spatial filter 400 of pre-filter 102 is controlled independent of the variance value VAR_ij, such as shown in FIG. 21. The control of filters 301 and 400 of pre-filter 102 are previously discussed.

For a video signal having a low transmission bit rate, noise reducer 301 of pre-filter 101 is controlled to filter the video signal with a filter characteristic shown in FIG. 18, wherein it is seen that the filter characteristic is stronger for low bit rate signals than for high bit rate signals. Spatial filter 400 of pre-filter 101 is controlled to filter the video signal based on the value of VAR_ij, as shown in FIG. 19, wherein the frequency response is greater, that is, stronger (i.e., the passband is smaller) than that for video signals having a high transmission bit rate. Thus, block distortion is not visible in the encoded video signal.

Further, for a video signal having a low transmission bit rate, noise reducer 301 and spatial filter 400 of pre-filter 102 are controlled independent of the average luminance level DC_ij and the variance level VAR_ij, as shown in FIGS. 20 and 21, respectively.

As previously discussed, a video signal having grain noise may be supplied directly, without pre-filtering, to hybrid encoder 104, but is pre-filtered to remove the grain noise before being supplied to ME unit 105, as long as the transmission bit rate is sufficiently high so that the picture can be encoded without substantial deterioration. If the transmission bit rate low, however, the video signal may be strongly filtered before it is supplied to hybrid encoder 104.

Figure 22:
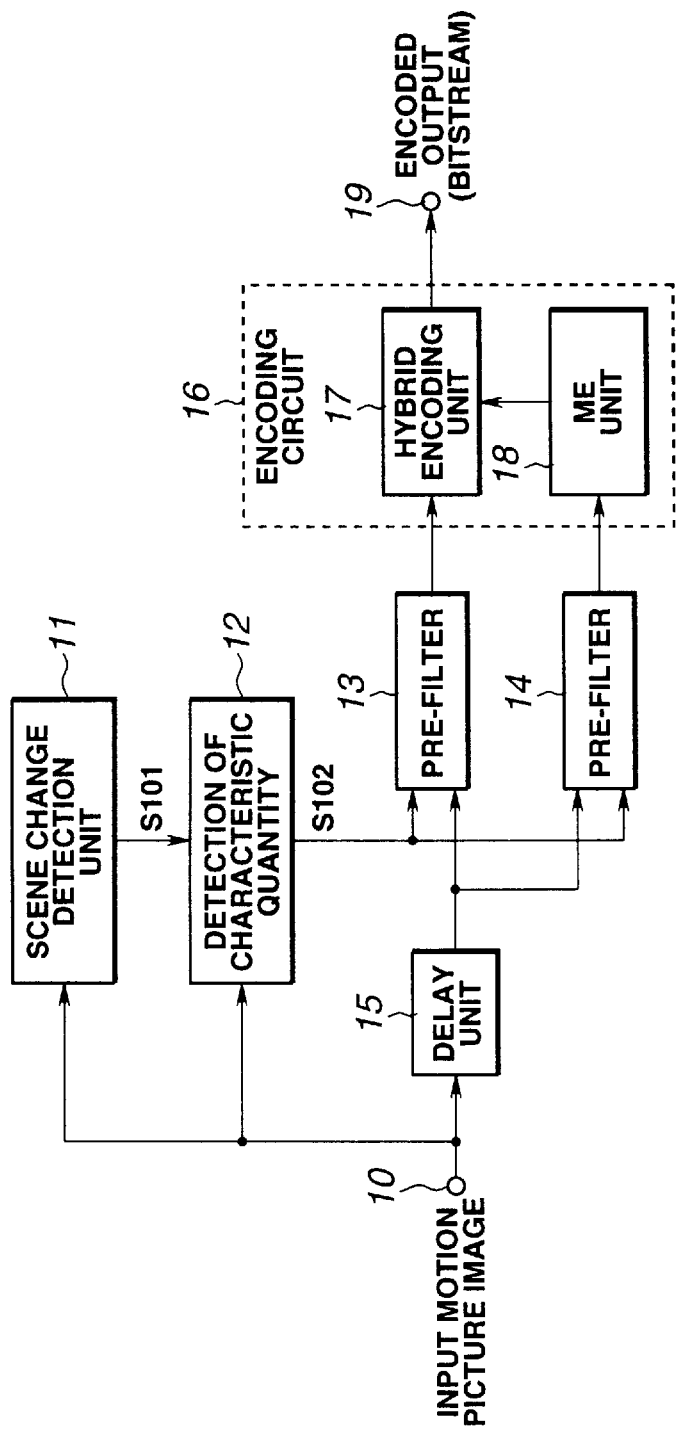
FIG. 22 is a block diagram of apparatus for encoding a digital video signal in accordance with a further embodiment of the present invention.

Referring next to FIG. 22, a block diagram of apparatus for encoding a digital video signal in accordance with a further embodiment of the present invention is shown. Video signals representing, for example, a television program or a motion picture, very often include plural type of scenes that have been edited and combined together. The various scenes may represent, for example, a still picture, successive images having very high motion therein (e.g., an automobile chase), a fine textured image, a coarse textured image, etc. In accordance with the present invention, a "scene" change is detected and characteristics of the new scene also are detected so that the filter characteristics can be appropriately controlled to reflect the new scene.

As shown in FIG. 22, the encoding apparatus is comprised of a scene change detection unit 11, a characteristic detector 12, pre-filters 13 and 14, a delay circuit 15, and an encoding circuit 16. Pre-filters 13 and 14 are similar to pre-filters 101 and 102 shown in FIG. 2, and encoding circuit 16, including hybrid encoder 17 and ME unit 18, is similar to encoding circuit 103 shown in FIG. 2, and thus, description of their operation is not repeated herein. A video signal supplied to input terminal 10 is supplied to scene change detector 11, characteristic detector 12 and delay circuit 15. Scene change detector operates to detect the occurrence of a new scene in the video signal by any manner known in the art, including detecting a scene change based on a difference between successive frames. Detector 11 supplies a scene change signal S101 to characteristic detector 12 indicating the occurrence of a scene change. Characteristic detector, in response to the scene change signal, detects the various characteristics, previously discussed, of the video signal supplied thereto corresponding to the entire scene (to be discussed) and supplies a characteristic signal which controls the respective filter response of pre-filters 13 and 14. Pre-filters are controlled in a manner similar to that previously discussed with reference to tables 1 and 2.

Delay circuit 15 is operable to delay the video signal supplied thereto by an amount of time equal to or greater than the amount of time of each scene. Thus, the entire "scene" is supplied to characteristic detector 12 for processing therein prior to the supply of that scene to pre-filters 13 and 14. The video signal is filtered in pre-filter 13 to produce a first-filtered video signal that is supplied to hybrid encoder 17, and is filtered in pre-filter 14 to produce a second-filtered video signal that is supplied to ME unit 18. Hybrid encoder 17 and ME unit 18 operate in the manner discussed above with respect to hybrid encoder 104 and ME unit 105, and thus description thereof is not repeated herein. Hybrid encoder subsequently outputs the encoded video signal as an output at output terminal 19.

Figure 23:
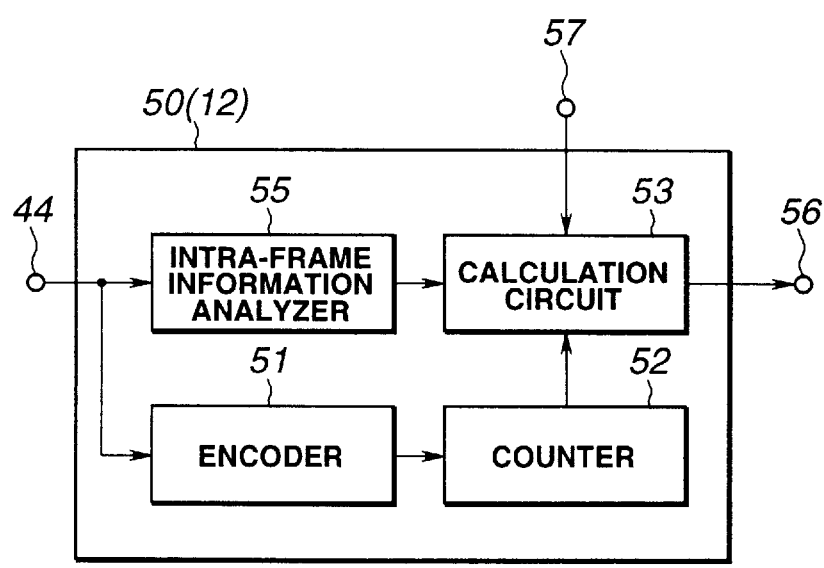
FIG. 23 is a block diagram of characteristic detector 12 shown in FIG. 22.

FIG. 23 is a block diagram of characteristic detector 12 shown in FIG. 22. Characteristic detector 12 is similar to character detector 110 shown in FIG. 9 except the scene change signal supplied from scene change detector 11 is supplied to calculation circuit 53. A video signal supplied to input terminal 44 is supplied to both encoder 51 and analyzer 55. Encoder 51, which is similar to the encoding circuit of FIG. 7, repetitively encodes the video signal using a pre-set frame pattern and a fixed quantization step size and supplies the encoded video signal to counter 52 which counts the number of bits in the resultant encoded signal and which supplies the counted number of bits to calculation circuit 53.

Analyzer 55 ascertains the mean luminance level of the supplied video signal and supplies the average luminance level to calculation circuit 53 which stores the count value and the average luminance level therein. At the occurrence of a new scene change, as indicated in the scene change signal, calculation circuit 53 ascertains the total number of bits in each type of frame (i.e., I, P and B-frame) in the scene, ascertains the ratio of bits included in each type of frame, and ascertains the average amounts therein. In addition, calculation circuit 53 calculates the various luminance information, previously discussed, using equations 2, 3 and 4, wherein each of the variables utilized is previously discussed except that a "scene" is used instead of a pre-set domain. For example, in the present embodiment, num is the number of frames in a scene, and ave_dc is the average luminance level of the scene. As with the first-discussed embodiment, FIG. 10 illustrates the approximate ratio of the number of bits in all of the I, P and B frames in a scene wherein the number of bits therein are approximately in equal proportions which represents that there is a relatively large amount of motion in the scene, whereas FIG. 12 illustrates a ratio of the number of bits in I, P and B frames in the scene having relatively little motion.

Figure 24:
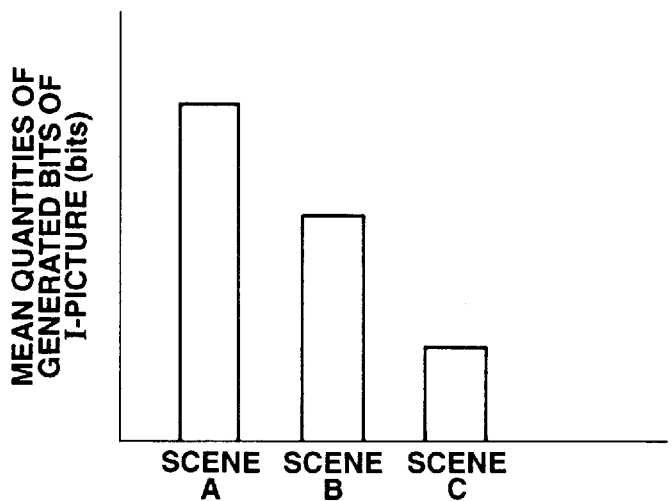
FIG. 24 schematically illustrates the relationship between the amount of data in various scenes.

FIG. 24 illustrates the amount of resultant encoded bits of the I-frames of three different scenes, wherein a relatively small amount of bits, such as with scene c, indicates that the scene is relatively course in texture, an average amount of bits, such as with scene b, indicates that the scene is average in texture, and a relatively large amount of bits, such as with scene a, indicates that the scene is relatively fine in texture.

Figure 25:
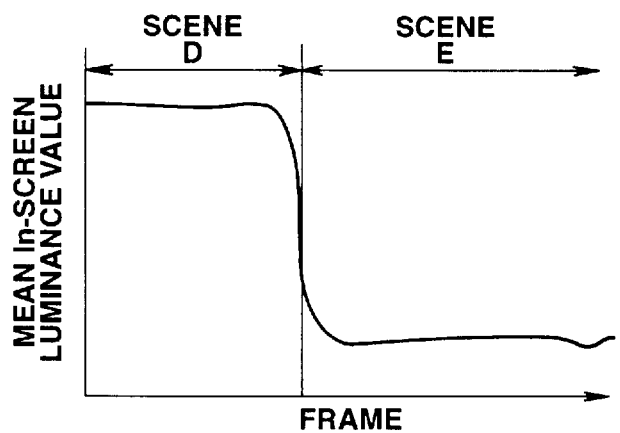
FIG. 25 schematically illustrates the position of a scene change as a function of the luminance values.

FIG. 25 schematically illustrates the position of a scene change as a function of the luminance values. As shown, scene D represents a light scene while scene E represents a dark scene. Thus, scenes are distinguished by their relative average luminance levels.

Figure 26:
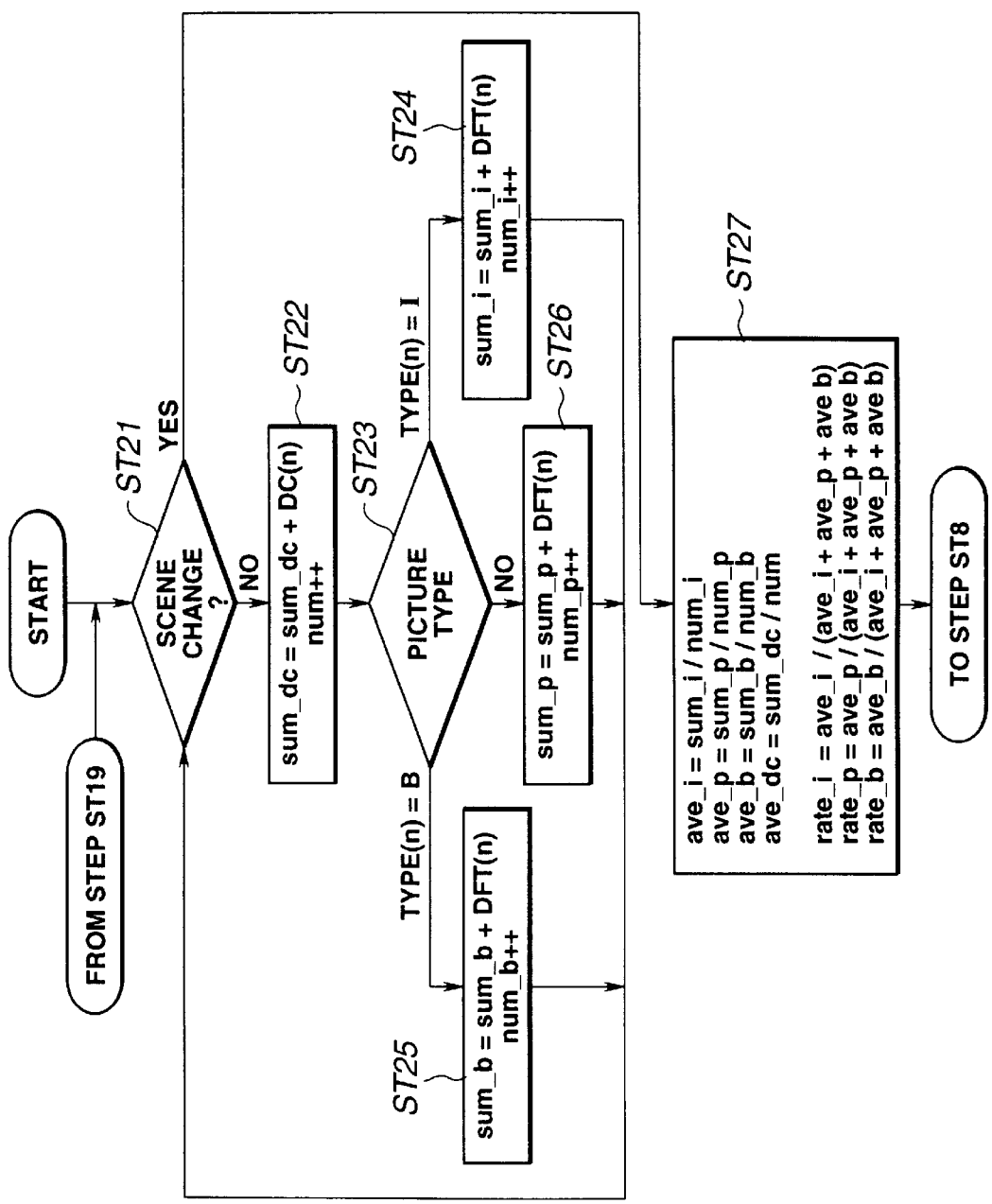
FIG. 26 is a flow chart of the operation of characteristic detector 12 shown in FIG. 22.

FIG. 26, along with FIG. 15, is a flow chart of the operation of calculation circuit 53 of characteristic detector 12 shown in FIG. 22. Each of the steps of FIG. 26 are similar to the steps shown in FIG. 14 except it is determined whether a scene change has occurred at inquiry ST21 in FIG. 26, whereas it is determined whether the end of a pre-set domain is reached in inquiry ST1 in FIG. 14. Thus, the flow chart of FIG. 26, and then continuing with the flow chart of FIG. 15, illustrates the operation of characteristic detector 12 to obtain each of the above-discussed characteristic values of a scene of the video signal. Since an understanding of the flow chart of FIG. 26 (which continues to FIG. 15) is readily obtainable from the above-discussion of the flow charts of FIGS. 14 and 15, a discussion of the operation of characteristic detector 12 is omitted herein. However, it is to be understood that frames included in a scene are processed to ascertain the various characteristics thereof instead of the frames included in a pre-set domain.

Figure 27:
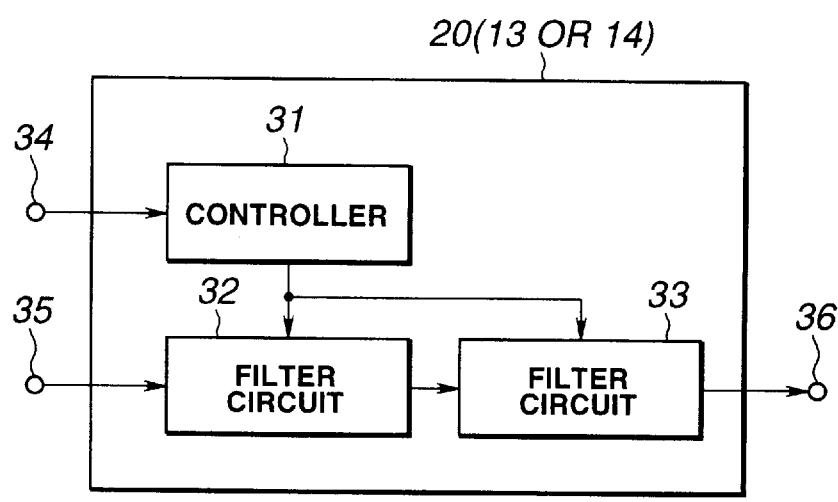
FIG. 27 is a block diagram of each of the pre-filters shown in FIG. 22.

FIG. 27 is a block diagram of each of the pre-filters shown in FIG. 22 wherein filter 32 is similar to noise reducer 301 shown in FIG. 3 and filter 33 is similar to spatial filter 400 shown in FIG. 3. In addition, controller 31 is a single circuit for controlling both filters 32 and 33, but may be comprised of separate controllers, such as shown as controllers 302 and 401 in FIG. 3. A characteristic signal supplied from characteristic detector 12 is supplied to input terminal 34 and then to controller 31, and the video signal output from delay circuit 15 is supplied to input terminal 35 and then to filter 32. The operation of each pre-filter, as shown in FIG. 27, is similar to the operation of each pre-filter 13 and 14, previously discussed, and therefore a description thereof is not repeated herein.

Figure 28:
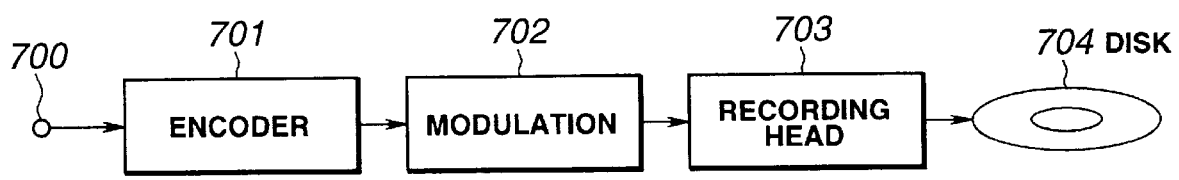
FIG. 28 is a block diagram of the encoding apparatus of the present invention included in an apparatus which records encoded data on a record medium.

FIG. 28 is a block diagram of an encoding and recording apparatus in which the present invention may be applied. As shown, the recording apparatus is comprised of an encoder 701, a modulator 702 and a recording circuit/head 703. A video signal supplied to an input terminal 700 is supplied to encoder 701 which operates to encode, including pre-filter, the supplied video signal in accordance with the present invention as previously discussed. The encoded video signal is modulated in circuit 702 before it is recorded on an optical disk 704 by recording head 703. The record medium may be other types of mediums, including a magnetic tape, an M-O disk, or other known record medium.

While the present invention has been particularly shown and described in conjunction with preferred embodiments thereof, it will be readily appreciated by those of ordinary skill in the art that various changes may be made without departing from the spirit and scope of the invention. For example, although specific characteristics of a digital video signal have been discussed herein as controlling the various pre-filters, the present invention is not limited to only to the characteristics of motion, luminance, texture and bit rate, and may be applied to other characteristics of a video signal in which controlling filter characteristics therefrom provides advantageous results.

Therefore, it is intended that the appended claims be interpreted as including the embodiments described herein, the alternatives mentioned above, and all equivalents thereto.

What is claimed is:

1. Apparatus for encoding a digital video signal, comprising:

receiving means for receiving a digital video signal;

first filtering means for filtering the received digital video signal in accordance with video signal characteristic data to produce a first filtered video signal;

second filtering means for filtering the received digital video signal in accordance with the video signal characteristic data to produce a second filtered video signal;

motion detecting means for detecting motion in the second filtered video signal to produce a motion vector; and encode means for encoding the first filtered video signal in accordance with the motion vector to produce an encoded video signal.

2. The apparatus of claim 1, further comprising characteristic detecting means for detecting a plurality of characteristics of the received digital video signal to produce the video signal characteristic data.

3. The apparatus of claim 2, wherein said receiving means receives a digital video signal having a predetermined bit rate; said characteristic detecting means is operable to detect the bit rate of the received digital video signal and to produce video signal characteristic data identifying the detected bit rate of the received digital video signal; and said first filtering means is operable to filter the received digital video signal in accordance with the detected bit rate included in the video signal characteristic data to produce the first filtered video signal.

4. The apparatus of claim 3, wherein said second filtering means operates to filter the received digital video signal independent of the detected bit rate as identified in the video signal characteristic data to produce the second filtered video signal.

5. The apparatus of claim 3, wherein said first filtering means is operable to not filter the received digital video signal when the detected bit rate as identified in the video signal characteristic data represents a high bit rate so that the first filtered video signal is the same as the received digital video signal.

6. The apparatus of claim 2, wherein said characteristic detecting means is operable to detect an amount of luminance of a video image represented by the received digital video signal and to produce video signal characteristic data identifying the detected amount of luminance, and said first and second filtering means are operable to filter the received digital video signal in accordance with the detected amount of luminance as identified in the video signal characteristic data to produce the first and second filtered video signals.

7. The apparatus of claim 6, wherein each said first and second filtering means includes time filtering means responsive to the detected amount of luminance for reducing a noise component obtained from successive frames in the received digital video signal to produce a respective time filtered video signal, and spatial filtering means not responsive to the detected amount of luminance for filtering spatial noise of each frame in the time filtered video signal to produce the respective first and second filtered video signals.

8. The apparatus of claim 2, wherein said characteristic detecting means is operable to detect an amount of motion of a video image represented by the received digital video signal and to produce video signal characteristic data identifying the detected amount of motion; and said first and second filtering means are operable to filter the received digital video signal in accordance with the detected amount of motion as identified in the video signal characteristic data to produce the first and second filtered video signals.

9. The apparatus of claim 8, wherein each said first and second filtering means includes time filtering means not responsive to the detected amount of motion for reducing a noise component obtained from successive frames in the received digital video signal to produce a respective time filtered video signal, and spatial filtering means responsive to the detected amount of motion for filtering spatial noise of each frame in the time filtered video signal to produce the respective first and second filtered video signals.

10. The apparatus of claim 8, wherein said characteristic detecting means further is operable to detect an amount of texture of the video image represented by the received digital video signal to produce said video signal characteristic data also identifying the detected amount of texture; and said first filtering means is operable to filter the received digital video signal in accordance with the detected amount of texture only when the detected amount of motion corresponds to a slow amount of motion of the video image represented by the received digital video signal.

11. The apparatus of claim 8, wherein said characteristic detecting means includes means for intraframe and interframe encoding the received digital video signal to produce intraframe and interframe encoded frames, and means for ascertaining an amount of data of said intraframe encoded frames and an amount of data of said interframe encoded frames; and means for ascertaining the amount of motion from a comparison between the respective amounts of data of the intraframe and interframe encoded frames.

12. The apparatus of claim 2, further comprising means for detecting a scene change of a video picture represented by the received digital video signal to produce a scene change signal; and wherein said characteristic detecting means is responsive to the scene change signal to detect a plurality of characteristics of each scene of the received digital video signal, each scene including a variable number of frames.

13. The apparatus of claim 1, wherein each said first and second filtering means includes a time filtering means for reducing a noise component obtained from successive frames in the received digital video signal to produce a respective time filtered video signal, spatial filtering means for filtering spatial noise of each frame in the time filtered video signal to produce the respective filtered video signal, and control means for controlling the respective time filtering means and spatial filtering means in accordance with the video signal characteristic data.

14. The apparatus of claim 13, wherein said time filtering means of each of said first and second filtering means is operable to filter the received digital video signal with a response characteristic that is a non-linear function of a value of the video signal characteristic data.

15. The apparatus of claim 1, wherein said encode means includes frame prediction means for predicting a frame of said first filtered video signal from the motion vector produced by said motion detecting means.

16. Method of encoding a digital video signal, comprising the steps of:

receiving a digital video signal;

filtering the received digital video signal in accordance with video signal characteristic data to produce a first filtered video signal;

filtering the received digital video signal in accordance with the video signal characteristic data to produce a second filtered video signal;

detecting motion in the second filtered video signal to produce a motion vector; and encoding the first filtered video signal in accordance with the motion vector to produce an encoded video signal.

17. The method of claim 16, further comprising the step of detecting a plurality of characteristics of the received digital video signal to produce the video signal characteristic data.

18. The method of claim 17, wherein said receiving step is carried out by receiving a digital video signal having a predetermined bit rate; said characteristic detecting step is carried out by detecting the bit rate of the received digital video signal and producing video signal characteristic data identifying the detected bit rate of the received digital video signal; and said first filtering step is carried out by filtering the received digital video signal in accordance with the detected bit rate included in the video signal characteristic data to produce the first filtered video signal.

19. The method of claim 18, wherein said second filtering step is carried out by filtering the received digital video signal independent of the detected bit rate as identified in the video signal characteristic data to produce the second filtered video signal.

20. The method of claim 18, wherein said first filtering step is carried out by not filtering the received digital video signal when the detected bit rate as identified in the video signal characteristic data represents a high bit rate so that the first filtered video signal is the same as the received digital video signal.

21. The method of claim 17, wherein said characteristic detecting step is carried out by detecting an amount of luminance of a video image represented by the received digital video signal and producing video signal characteristic data identifying the detected amount of luminance, and said first and second filtering steps both are carried out by filtering the received digital video signal in accordance with the detected amount of luminance as identified in the video signal characteristic data to produce the first and second filtered video signals.

22. The method of claim 21, wherein said first and second filtering steps both are carried out by time filtering in accordance with the detected amount of luminance the received digital video signal so as to reduce a noise component obtained from successive frames in the received digital video signal, and spatial filtering, independent of the detected amount of luminance, the time filtered video signal to remove spatial noise of each frame in the time filtered video signal to produce the respective first and second filtered video signals.

23. The method of claim 17, wherein said characteristic detecting step is carried out by detecting an amount of motion of a video image represented by the received digital video signal and producing video signal characteristic data identifying the detected amount of motion; and said first and second filtering steps both are carried out by filtering the received digital video signal in accordance with the detected amount of motion as identified in the video signal characteristic data to produce the first and second filtered video signals.

24. The method of claim 23, wherein said first and second filtering steps both are carried out by time filtering, independent of the detected amount of motion, the received digital video signal to reduce a noise component obtained from successive frames in the received digital video signal, and spatial filtering in accordance with the detected amount of motion the time filtered digital video signal to remove spatial noise from each frame in the time filtered video signal to produce the respective first and second filtered video signals.

25. The method of claim 23, wherein said characteristic detecting step is carried out by detecting an amount of texture of the video image represented by the received digital video signal so that the video signal characteristic data also identifies the detected amount of texture; and said first filtering step is carried out by filtering the received digital video signal in accordance with the detected amount of texture only when the detected amount of motion corresponds to a slow amount of motion of the video image represented by the received digital video signal.

26. The method of claim 23, wherein said characteristic detecting step includes the steps of intraframe and interframe encoding the received digital video signal to produce intraframe and interframe encoded frames, ascertaining an amount of data of the intraframe encoded frames and an amount of data of the interframe encoded frames; and ascertaining the amount of motion from a comparison between the respective amounts of data of the intraframe and interframe encoded frames.

27. The method of claim 17, further comprising the step of detecting a scene change of a video picture represented by the received digital video signal; and wherein said characteristic detecting step is carried out for each scene change to detect a plurality of characteristics of each scene of the received digital video signal.

28. The method of claim 16, wherein said first and second filtering steps both include the steps of time filtering the received digital video signal so as to reduce a noise component obtained from successive frames in the received digital video signal, spatial filtering the time filtered video signal to filter spatial noise from each frame in the time filtered video signal, and controlling the time filtering and the spatial filtering in accordance with the video signal characteristic data.

29. The method of claim 28, wherein said time filtering step is carried out by filtering the received digital video signal with a response characteristic that is a non-linear function of a value of the video signal characteristic data.

30. The method of claim 16, wherein said encoding step is carried out by predicting a frame of the first filtered video signal from the produced motion vector.

31. Apparatus for encoding a digital video signal, comprising:
receiving means for receiving a digital video signal;
means for detecting a scene change of a video picture represented by the received digital video signal to produce a scene change signal;
characteristic detecting means, responsive to the scene change signal, for detecting a plurality of characteristics of the received digital video signal to produce video signal characteristic data;
first filtering means for filtering the received digital video signal in accordance with video signal characteristic data to produce a first filtered video signal;
second filtering means for filtering the received digital video signal in accordance with the video signal characteristic data to produce a second filtered video signal;
motion detecting means for detecting motion in the second filtered video signal to produce a motion vector; and
encode means for encoding the first filtered video signal in accordance with the motion vector to produce an encoded video signal.

32. The apparatus of claim 31, wherein said characteristic detecting means produces new video signal characteristic data only in response to the scene change signal.

33. Method of encoding a digital video signal, comprising the steps of:
receiving a digital video signal;
detecting a scene change of a video picture represented by the received digital video signal to produce a scene change signal;
detecting, in response to the scene change signal, a plurality of characteristics of the received digital video signal to produce video signal characteristic data;
filtering the received digital video signal in accordance with video signal characteristic data to produce a first filtered video signal;

filtering the received digital video signal in accordance with the video signal characteristic data to produce a second filtered video signal;

detecting motion in the second filtered video signal to produce a motion vector; and encoding the first filtered video signal in accordance with the motion vector to produce an encoded video signal.

34. The method of claim 33, wherein said step of detecting a plurality of characteristics is carried out by producing new video signal characteristic data only when a new scene is detected.

35. A record medium formed by the process of:

receiving a digital video signal;

filtering the received digital video signal in accordance with video signal characteristic data to produce a first filtered video signal;

filtering the received digital video signal in accordance with the video signal characteristic data to produce a second filtered video signal;

detecting motion in the second filtered video signal to produce a motion vector;

encoding the first filtered video signal in accordance with the motion vector to produce an encoded video signal; and recording the encoded video signal on said record medium.

36. The record medium of 35, wherein video signal characteristic data representing characteristics of the received digital video signal is generated only in response to detection of a scene change of a video picture represented by the received digital video signal.

* * * * *